US009969348B2

(12) United States Patent
Fujiwara

(10) Patent No.: US 9,969,348 B2
(45) Date of Patent: May 15, 2018

(54) VEHICLE SIDE AIRBAG DEVICE AND VEHICLE SEAT

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 14/908,374

(22) PCT Filed: Jun. 10, 2014

(86) PCT No.: PCT/JP2014/065373
§ 371 (c)(1),
(2) Date: Jan. 28, 2016

(87) PCT Pub. No.: WO2015/015912
PCT Pub. Date: Feb. 5, 2015

(65) Prior Publication Data
US 2016/0159313 A1    Jun. 9, 2016

(30) Foreign Application Priority Data

Jul. 31, 2013 (JP) ................................. 2013-159709

(51) Int. Cl.
*B60R 21/207* (2006.01)
*B60R 21/2338* (2011.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/207; B60R 21/233; B60R 21/2338; B60R 21/2334;
(Continued)

(56) References Cited

U.S. PATENT DOCUMENTS

2011/0042922 A1    2/2011  Miyata
2012/0200072 A1 *  8/2012  Fukawatase ...... B60R 21/23138
                                                    280/741
(Continued)

FOREIGN PATENT DOCUMENTS

EP         1531096 A1    5/2005
JP      2000-255369 A    9/2000
(Continued)

*Primary Examiner* — Keith J Frisby
(74) *Attorney, Agent, or Firm* — Oliff PLC

(57) ABSTRACT

Influence from a rear bag section is prevented or suppressed from being applied to an occupant out of position. In a state in which a side airbag inflates and deploys frontward of a side support section of a seat back, a front-rear partition cloth that partitions a bag body into a front bag section and a rear bag section brings an intermediate portion in a vehicle width direction of a front surface of the rear bag section to be recessed toward a vehicle rearward direction so as to be a valley-shaped recessed portion. Through this, even if the side airbag inflates and deploys while the occupant is located frontward of the side support section, it is possible to prevent or suppress influence from the rear bag section to this occupant.

22 Claims, 15 Drawing Sheets

(51) Int. Cl.
　　*B60R 21/231*　　(2011.01)
　　*B60R 21/233*　　(2006.01)
　　*B60R 21/237*　　(2006.01)
　　*B60R 21/26*　　(2011.01)
　　*B60R 21/00*　　(2006.01)

(52) U.S. Cl.
　　CPC ............ *B60R 21/237* (2013.01); *B60R 21/26* (2013.01); *B60R 21/2338* (2013.01); *B60R 2021/0006* (2013.01); *B60R 2021/0032* (2013.01); *B60R 2021/23146* (2013.01); *B60R 2021/23324* (2013.01); *B60R 2021/23382* (2013.01)

(58) Field of Classification Search
　　CPC ........ B60R 21/231; B60R 2021/23146; B60R 2021/23308; B60R 2021/23324; B60R 2021/23382; B60R 2021/0006
　　USPC .................. 280/730.2, 729, 743.2, 743.1
　　See application file for complete search history.

(56) References Cited

U.S. PATENT DOCUMENTS

| 2012/0248746 | A1 | 10/2012 | Yamamoto |
| 2013/0076013 | A1 | 3/2013 | Shibayama et al. |
| 2014/0035264 | A1 | 2/2014 | Fukushima et al. |
| 2015/0014970 | A1 | 1/2015 | Fujiwara |

FOREIGN PATENT DOCUMENTS

| JP | 2005-022473 | A | 1/2005 |
| JP | 2008-201172 | A | 9/2008 |
| JP | 2008-201175 | A | 9/2008 |
| JP | 2011-240807 | A | 12/2011 |
| JP | 2012-025182 | A | 2/2012 |
| JP | 2014-031096 | A | 2/2014 |
| JP | 2015-013500 | A | 1/2015 |
| WO | 2011-077510 | A1 | 6/2011 |
| WO | 2013/114591 | A1 | 8/2013 |
| WO | 2015/001912 | A1 | 1/2015 |

\* cited by examiner

VEHICLE SIDE AIRBAG DEVICE AND VEHICLE SEAT

TECHNICAL FIELD

The present invention relates to a vehicle side airbag device and a vehicle seat.

BACKGROUND ART

In a side airbag device described in the following Patent Literature 1, a side airbag is sectioned into a first inflating section (rear bag section) and a second inflating section (front bag section) by a partition wall (front-rear partition) disposed at a position corresponding to a rib region of an occupant in position. An inflator is provided inside the first inflating section, and gas generated from the inflator is supplied through communicating ports formed in the front-rear partition into the front bag section. Through this, the rear bag section is set at a higher pressure than that of the front bag section, thereby securing an initial restraint performance for the occupant in position, and also suppressing influence applied to the occupant even if the occupant is in an inappropriate position (out of position). As the related art of the present invention, the following Patent Literatures 2 to 6 are included, for example.

CITATION LIST

Patent Literature

Patent Literature 1: Japanese Patent Application Publication No. 2012-025182
Patent Literature 2: Japanese Patent Application Publication No. 2011-240807
Patent Literature 3: Japanese Patent Application Publication No. 2008-201172
Patent Literature 4: Japanese Patent Application Publication No. 2008-201175
Patent Literature 5: Japanese Patent Application Publication No. 2014-031096
Patent Literature 6: International Publication No. WO 2013/114591

SUMMARY OF THE INVENTION

Technical Problem

However, in some vehicle seats, side support sections in which side airbags are installed in seat back are configured to have a smaller frontward projection. In such a case, rear bag sections might greatly inflate and deploy to a more vehicle frontward position than front edges of the side support sections.

Considering the above facts, an object of the present invention is to obtain a vehicle side airbag device and a vehicle seat capable of preventing or suppressing influence from a rear bag section to an occupant out of position.

Solution to Problem

A vehicle side airbag device of a first aspect of the present invention includes: an inflator that generates gas by being actuated; a bag body formed in a bag form, the bag body housed in a folded-up state inside a side support section of a seat back of a vehicle seat, the bag body inflating and deploying to a vehicle frontward direction of the side support section if the gas is supplied inside the bag body; and a front-rear partition that partitions the bag body into a front bag section and a rear bag section, the front-rear partition bringing an intermediate portion in a vehicle width direction of a front surface of the rear bag section to be recessed toward a vehicle rearward direction in an inflation and deployment state of the bag body.

In the first aspect, if the inflator is actuated, the gas generated from the inflator is supplied into the bag body, so that the bag body inflates and deploys in the vehicle frontward direction of the side support section of the seat back. In this inflation and deployment state, the front-rear partition that partitions the bag body into the front bag section and the rear bag section brings the intermediate portion in the vehicle width direction of the front surface of the rear bag section to be recessed toward the vehicle rearward direction. Through this, it is possible to prevent or suppress influence from the rear bag section to the occupant out of position.

In the vehicle side airbag device of a second aspect of the present invention, in the first aspect, the front-rear partition partitions the rear bag section into left and right chambers that are arranged side by side in the vehicle width direction in the inflation and deployment state.

In the second aspect, when the bag body inflates and deploys, the left and right chambers of the rear bag section respectively inflate, and are arranged side by side in the vehicle width direction (vehicle left and right direction). Hence, compared with the case of configuring the rear bag section by a single chamber, it is possible to increase an inflation thickness in the vehicle width direction of the rear bag section. In other words, while securing an inflation thickness in the vehicle width direction of the rear bag section, it is possible to reduce an inflation thickness in the vehicle front-rear direction of the rear bag section. Accordingly, while securing the occupant restraint performance by the rear bag section, it is possible to further effectively prevent or suppress influence from the rear bag section to the occupant out of position.

In the vehicle side airbag device of a third aspect of the present invention, in the second aspect, the front-rear partition includes a left partition and a right partition that are arranged side by side in the vehicle width direction in the inflation and deployment state.

In the third aspect, the rear bag section is partitioned into the left and right chambers by the left partition and the right partition that are arranged side by side in the vehicle width direction in the inflation and deployment state of the bag body. Herein, if the left and right chambers that are inflating and deploying interfere with the occupant or the like from the vehicle rearward direction, the left and right chambers move apart from each other, thereby effectively reducing influence applied to the occupant or the like.

In the vehicle side airbag device of a fourth aspect of the present invention, in the second or third aspect, the inflator and a rectifying portion that distributes the gas from the inflator into the left and right chambers are provided inside the rear bag section, and left and right communicating ports that respectively communicate the left and right chambers with an inside of the front bag section are formed in the front-rear partition.

In the fourth aspect, the gas generated from the inflator provided inside the rear bag section is distributed by the rectifying portion to the left and right chambers.

The gas distributed to the left and right chambers is supplied through the left and right communicating ports formed in the front-rear partition into the front bag section. Through this, it is possible to bring the rear bag section and the front bag section to inflate and deploy in well balance, so that the deployment behavior of the bag body is stabilized.

In the vehicle side airbag device of a fifth aspect of the present invention, in the fourth aspect, the rectifying portion is composed of part of the front-rear partition.

In the fifth aspect, the rectifying portion that rectifies the gas from the inflator is composed of part of the front-rear partition that partitions the bag body into front and rear sections, thereby simplifying the structure.

In the vehicle side airbag device of a sixth aspect of the present invention, in the fifth aspect, the rectifying portion is formed in a cylindrical shape having flexibility, and the inflator is housed inside the rectifying portion.

In the sixth aspect, the rectifying portion composed of part of the front-rear partition is formed in a cylindrical shape having flexibility. When the inflator generates the gas in the inside of this rectifying portion, the rectifying portion inflates by a pressure of the gas. Hence, the front surface of the rear bag section formed of the front-rear partition can be pulled toward the inflator (vehicle rearward direction). As a result, it is possible to further effectively prevent or suppress influence from the rear bag section to the occupant out of position.

In the vehicle side airbag device of a seventh aspect of the present invention, in the sixth aspect, an aperture is formed in an intermediate portion in an axial direction of the rectifying portion.

In the seventh aspect, the aperture is formed in the intermediate portion in the axial direction of the rectifying portion formed in a cylindrical shape. Hence, the gas generated from the inflator housed inside the rectifying portion is supplied not only through the apertures at both ends in the axial direction of the rectifying portion but also through the aperture in the intermediate portion in the axial direction into the rear bag section. Through this, it is possible to promote the inflation and deployment of the rear bag section.

In the vehicle side airbag device of an eighth aspect of the present invention, in any one of the first to seventh aspects, if the inflation and deployment state is viewed from the vehicle width direction, the front-rear partition is provided in such a manner that at least part of a front edge of the rear bag section is located at a more vehicle rearward position than a front edge of the side support section.

In the eighth aspect, because of the above configuration, compared with the case of the entire front surface of the rear bag section projecting to a more vehicle frontward position than the front edge of the side support section, it is possible to reduce influence from the rear bag section to the occupant out of position.

In the vehicle side airbag device of a ninth aspect of the present invention, in the eighth aspect, the seat back is located at a lateral position of a side door of the vehicle, and the at least part of the front edge of the rear bag section is defined at a height equivalent to a height of an upper surface of an armrest provided to the side door.

In the ninth aspect, at least at the height equivalent to the height of the upper surface of the armrest disposed to the side door, the front surface of the inflating and deploying rear bag section is located at a more vehicle rearward position than the front edge of the side support section. Hence, even if the bag body inflates and deploys in a state in which the occupant leans his or her head or the like against the armrest, it is possible to prevent or suppress influence from the rear bag section to the occupant.

In the vehicle side airbag device of a tenth aspect of the present invention, in any one of the first to ninth aspects, the front-rear partition is provided in such a manner that the front edge of the inflating and deploying rear bag section extends along an up-down direction of the seat back.

In the tenth aspect, because of the above configuration, it is possible to prevent part of the inflating and deploying rear bag section from greatly projecting locally from the side support section of the seat back toward the vehicle frontward direction.

In the vehicle side airbag device of an eleventh aspect of the present invention, in any one of the first to ninth aspects, the front-rear partition is provided in such a manner that the front edge of the inflating and deploying rear bag section is composed of a vertical extending portion extending in the up-down direction of the seat back and a tilting portion obliquely upwardly extending in the vehicle frontward direction from an upper end of the vertical extending portion.

In the eleventh aspect, at the time of inflation and deployment of the bag body, the upper portion of the rear bag section that is partitioned from the front bag section along the aforementioned tilting portion projects above the front bag section. Through this, it is possible to restrain the shoulder region of the occupant in position by the upper portion of the rear bag section.

In the vehicle side airbag device of a twelfth aspect of the present invention, in the eleventh aspect, the vehicle side airbag device further includes: an up-down partition that partitions the bag body into the front and rear bag sections and a lower bag section; and a check valve that guides the gas from the inflator provided inside the rear bag section into the lower bag section, the check valve restricting a gas flow from the lower bag section to the rear bag section by increase in inner pressure of the lower bag section.

In the twelfth aspect, when the bag body inflates and deploys by actuating the inflator, it is possible to retain the inner pressure of the lower bag section to be high by the above check valve. Accordingly, it is possible to effectively restrain the lumbar region of the occupant in position by the lower bag section.

In the vehicle side airbag device of a thirteenth aspect of the present invention, in the twelfth aspect, if the inflation and deployment state is viewed from the vehicle width direction, the up-down partition is so defined as to downwardly tilt in the frontward direction relative to a front-rear direction of the seat back.

In the thirteenth aspect, the inflation thickness in the vehicle up-down direction of the inflating and deploying lower bag section may be configured to be smaller as it extends toward the vehicle frontward direction; therefore, it is possible to prevent or suppress influence from the lower bag section to the occupant out of position.

In the vehicle side airbag device of a fourteenth aspect of the present invention, in any one of the third to seventh aspects, the front-rear partition is a front-rear partition cloth formed of a cloth material, and the front-rear partition cloth integrally includes the left partition and the right partition, and the cylindrical-shaped rectifying portion that distributes the gas from the inflator to the left and right chambers.

In the fourteenth aspect, the front-rear partition cloth formed of a cloth material integrally includes the left partition and the right partition that respectively partition the rear bag section into the left and right chambers, and the rectifying portion that rectifies the gas from the inflator, thereby simplifying the structure.

In the vehicle side airbag device of a fifteenth aspect of the present invention, in the eighth or ninth aspect, the at least part is a lower portion of the front edge of the rear bag section.

In the fifteenth aspect, if the inflation and deployment state of the side airbag is viewed from the vehicle width direction, the front-rear partition is provided in such a manner that the lower portion of the front edge of the rear bag section is located at a more vehicle rearward position than the front edge of the side support section. Through this, it is possible to reduce influence from the lower portion of the rear bag section to the occupant out of position.

In the vehicle side airbag device of a sixteenth aspect of the present invention, in any one of the second to seventh aspects, the left and right chambers are formed to be left-right asymmetric.

In the sixteenth aspect, the left and right chambers partitioned by the front-rear partition are formed to be left-right asymmetric. Through this, it is possible to prevent the left and right seams at which the front-rear partition is stitched to the base fabric of the bag body from being overlaid on each other when the side airbag is folded up, for example. As a result, the side airbag can be compactly folded up.

In the vehicle side airbag device of a seventeenth aspect of the present invention, in any one of the second to seventh aspects, in an upper portion of the rear bag section, a front extending portion that extends above the front bag section in the inflation and deployment state is formed, and the upper portion of the rear bag section including the front extending portion is not partitioned into the left and right chambers.

In the seventeenth aspect, the upper portion of the rear bag section including the front extending portion is not partitioned into the left and right chambers. Hence, compared with the case of partitioning the upper portion of the rear bag section into the left and right chambers, it is possible to reduce the inflation thickness in the vehicle width direction in the upper portion of the rear bag section. Through this, it is possible to bring the upper portion of the rear bag section to inflate and deploy in a small gap between the shoulder region of the occupant and a lateral part of the vehicle body in a preferable manner, for example.

In the vehicle side airbag device of an eighteenth aspect of the present invention, in any one of the second to seventh aspects, in an upper portion of the rear bag section, a front extending portion that extends above the front bag section in the inflation and deployment state is formed, and the upper portion of the rear bag section including the front extending portion is partitioned into the left and right chambers.

In the eighteenth aspect, the upper portion of the rear bag section including the front extending portion is partitioned into the left and right chambers. Hence, compared with the case in which the upper portion of the rear bag section is not partitioned into the left and right chambers, it is possible to increase the inflation thickness in the vehicle width direction in the upper portion of the rear bag section. Accordingly, it is possible to enhance the restrain performance of the shoulder region of the occupant, for example.

In the vehicle side airbag device of a nineteenth aspect of the present invention, in the fourteenth aspect, in the front-rear partition cloth, the left partition and the right partition are stitched to the rectifying portion at a seam, and the left partition and the right partition are stitched to each other at another seam defined to be closer to a front end of the bag body than the seam.

In the nineteenth aspect, because of the above configuration, it is possible to stabilize a position of a boundary between the front bag section and the rear bag section that are partitioned by the front-rear partition cloth. This configuration is suitable for the case of setting the frontward projection of the side support section of the seat back to be greater, that is, for the case in which the rear bag section is difficult to greatly inflate and deploy to a more vehicle frontward position than the front edge of the side support section.

In the vehicle side airbag device of a twentieth aspect of the present invention, in the first aspect, the front-rear partition includes: a main body that partitions the bag body into the front bag section and the rear bag section; a cylindrical-shaped rectifying portion that is stitched to a rear end of the bag body, and rectifies the gas from the inflator; and a strap portion extending across between the main body and the rectifying portion.

In the twentieth aspect, in the front-rear partition, by stretching the strap portion extending across between the main body and the rectifying portion, it is possible to bring the intermediate portion in the vehicle width direction of the main body to be recessed toward the vehicle rearward direction. Hence, it is possible to simplify the structure of the front-rear partition, compared with the configuration of partitioning the rear bag section by the front-rear partition into the left and right chambers.

A vehicle seat of a twenty first aspect of the present invention includes: a seat cushion; a seat back; and the vehicle side airbag device according to any one of the first to twentieth aspects, the vehicle side airbag device housed inside a side support section of the seat back in a state in which the bag body is folded up.

The vehicle seat of the twenty first aspect includes the vehicle side airbag device according to any one of the first to twentieth aspects; therefore, it is possible to attain the aforementioned operational effects.

Advantageous Effects of the Invention

As aforementioned, the vehicle side airbag device and the vehicle seat according to the present invention is capable of reducing influence from the rear bag section to an occupant out of position.

MODES FOR CARRYING OUT THE INVENTION

First Embodiment

A vehicle side airbag device 10 and a vehicle seat 12 according to the first embodiment of the present invention will be described with reference to FIG. 1 to FIG. 7. Arrow FR, Arrow UP, and Arrow OUT as appropriately described in each drawing indicate a frontward direction (advancing direction), an upward direction, and outward in a width direction of a vehicle, respectively. Hereinafter, in explanation simply using front-rear, up-down, and left-right directions, these will be indicated as front or rear in the vehicle front-rear direction, up or down in the vehicle up-down direction and left or right in the vehicle advancing direction, unless otherwise specified.

(Configuration)

Figure 1:
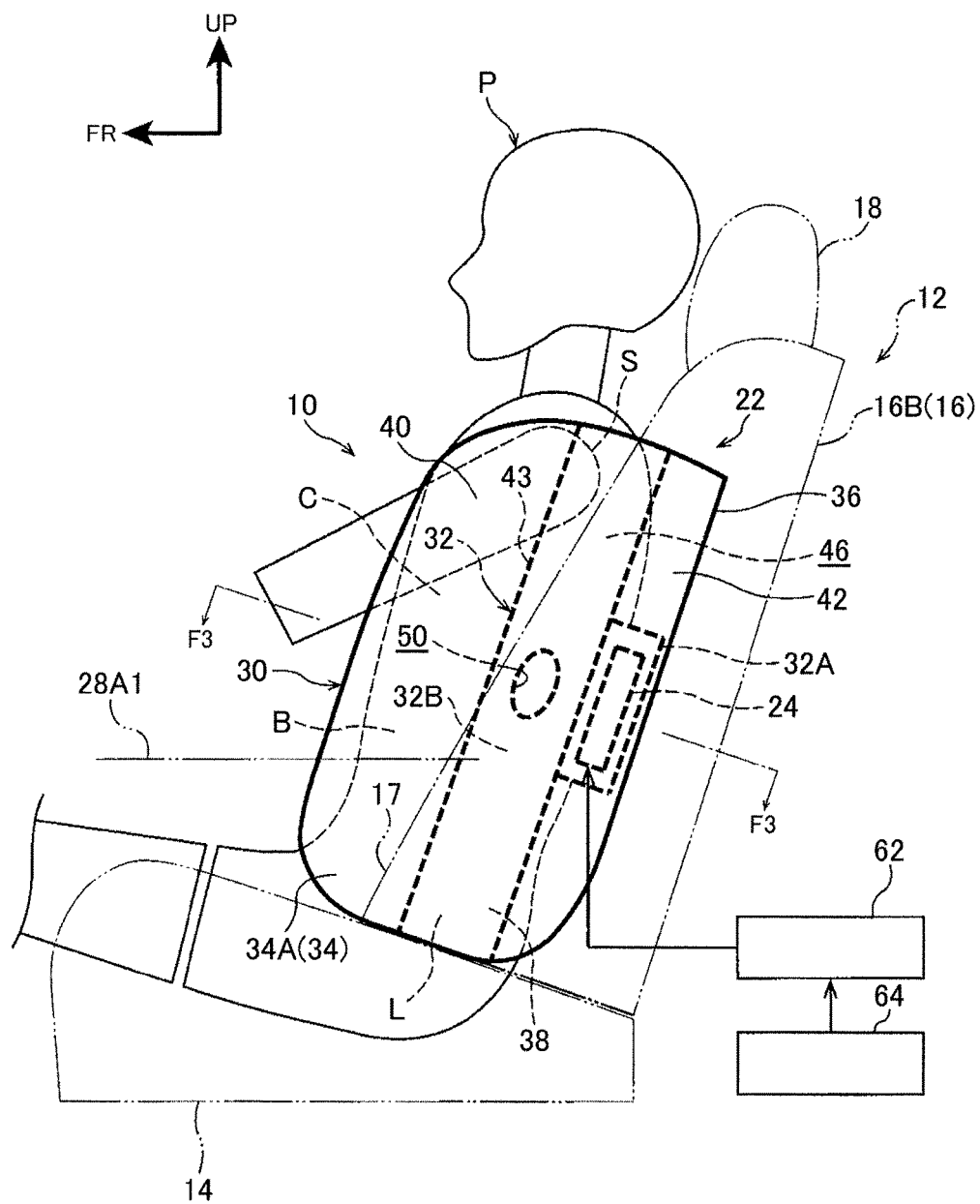
FIG. 1 is a side view of a vehicle seat according to a first embodiment of the present invention, and is a drawing of a state in which a side airbag of a vehicle side airbag device inflates and deploys.
Figure 2:
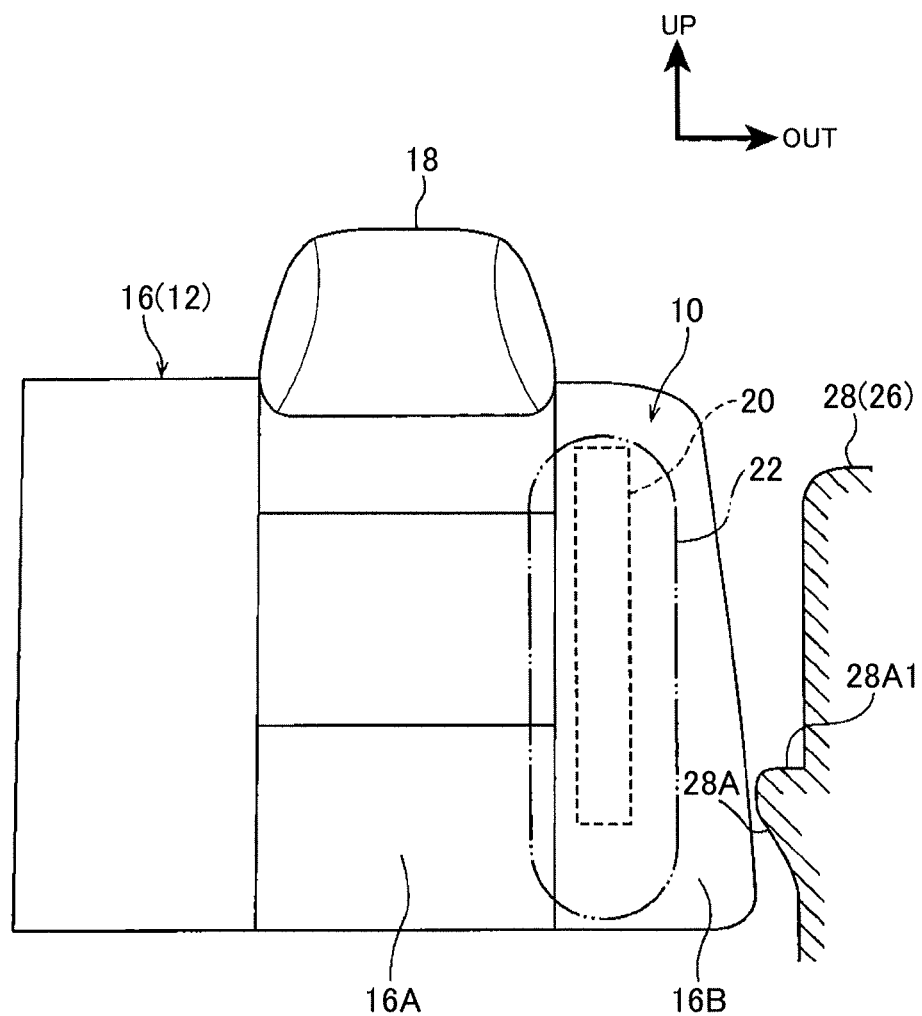
FIG. 2 is a front view of a seat back of the vehicle seat according to the first embodiment as viewed from a vehicle frontward direction.

The vehicle seat 12 as shown in FIG. 1 and FIG. 2 is a back seat (rear seat) of an automobile. This vehicle seat 12 includes a seat cushion 14 (not shown in FIG. 2) in which an occupant P is seated, a seat back 16 supporting a back of the occupant P, and a headrest 18 supporting a head of the occupant P; and the vehicle seat 12 is located at a lateral position of a side door 26 (lateral part of a vehicle body). In the present embodiment, a front-rear direction, a left-right direction (width direction), and an up-down direction of the vehicle seat 12 coincide with the front-rear direction, the left-right direction (width direction), and the up-down direction of the vehicle. The occupant P as shown in FIG. 1 (not shown in FIG. 2) is a dummy for a side impact test. This dummy is an AM50 (model covering 50% of American adult males) of the WorldSID (World Side Impact Dummy), for example.

A side support section 16B is provided to an outer lateral part in the vehicle width direction of the seat back 16. The side support section 16B is configured to project (protrude) to a more vehicle frontward position than a back rest 16A of the seat back 16, and support the occupant P from outward in the vehicle width direction. Inside the side support section 16B, a side airbag module 20 (see FIG. 2) that is a component of the vehicle side airbag device 10 is housed.

A side airbag module 20 includes a side airbag 22 and an inflator 24 (gas generator) generating gas in the side airbag 22 as main components thereof. The side airbag 22 is folded up in a unitized (modularized) state together with the inflator 24 and others, and is disposed (housed) inside the side support section 16B, and inflates and deploys between the occupant P and a door trim 28 of the side door 26 by a pressure of the gas generated from the inflator 24. At the time of this inflation and deployment, a pad material and an outer skin material disposed to the side support section 16B receive an inflating pressure of the side airbag 22 so as to be fractured. The front-rear and up-down directions of the side airbag 22 as described in the following explanation indicate respective directions in a state where the side airbag 22 inflates and deploys, and substantially coincide with the front-rear and up-down directions of the seat back 16, unless otherwise specified.

Figure 3:
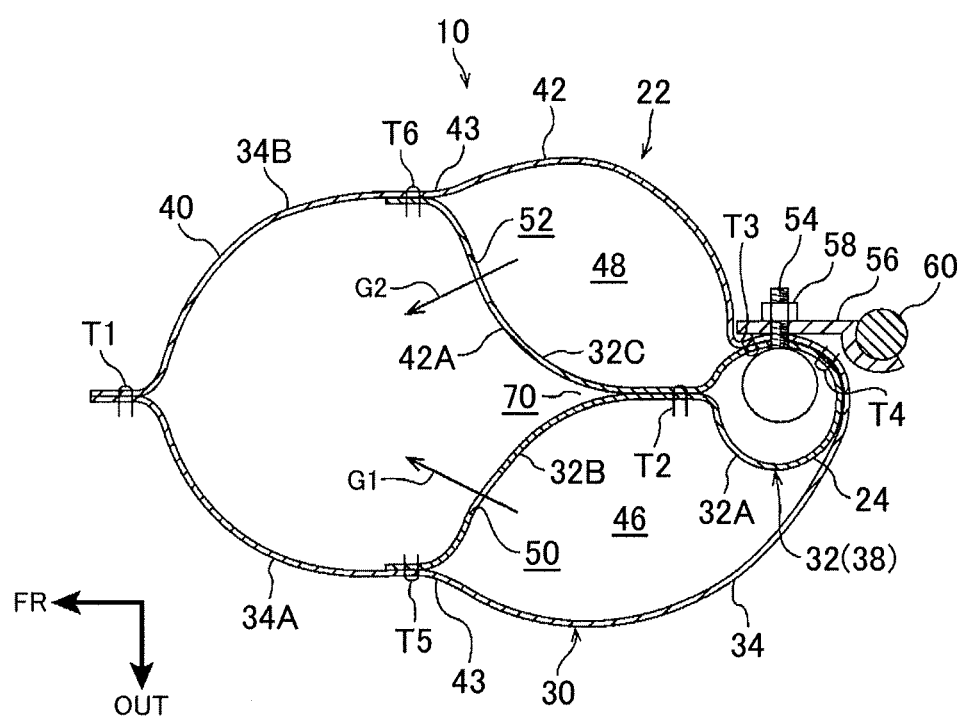
FIG. 3 is an enlarged sectional view showing a section taken along line F3-F3 of FIG. 1.

As shown in FIG. 1 to FIG. 3, the side airbag 22 is a side airbag of which inside is partitioned into front and rear sections, and includes a bag body 30 formed in a bag form, and a front-rear partition cloth 32 as a front-rear partition partitioning the inside of the bag body 30. The bag body 30 is formed by folding a single base fabric 34 that is cut out of a nylon- or polyester-base cloth material, for example, into two along a folded line 36, and stitching an outer peripheral edge thereof at a seam T1 so as to be formed in a long bag form. If the inflation and deployment state of this bag body 30 is viewed in a side view as shown in FIG. 1, the bag body 30 is formed in a substantially long oval shape (substantially rectangular shape) extending in the up-down direction of the seat back 16, and is defined to be large enough to restrain a shoulder region S, a chest region C, an abdominal region B, and a lumbar region L of the occupant P. It should be noted that the seam T1 and seams T2 to T6 described later are not shown in FIG. 1.

Figure 4:
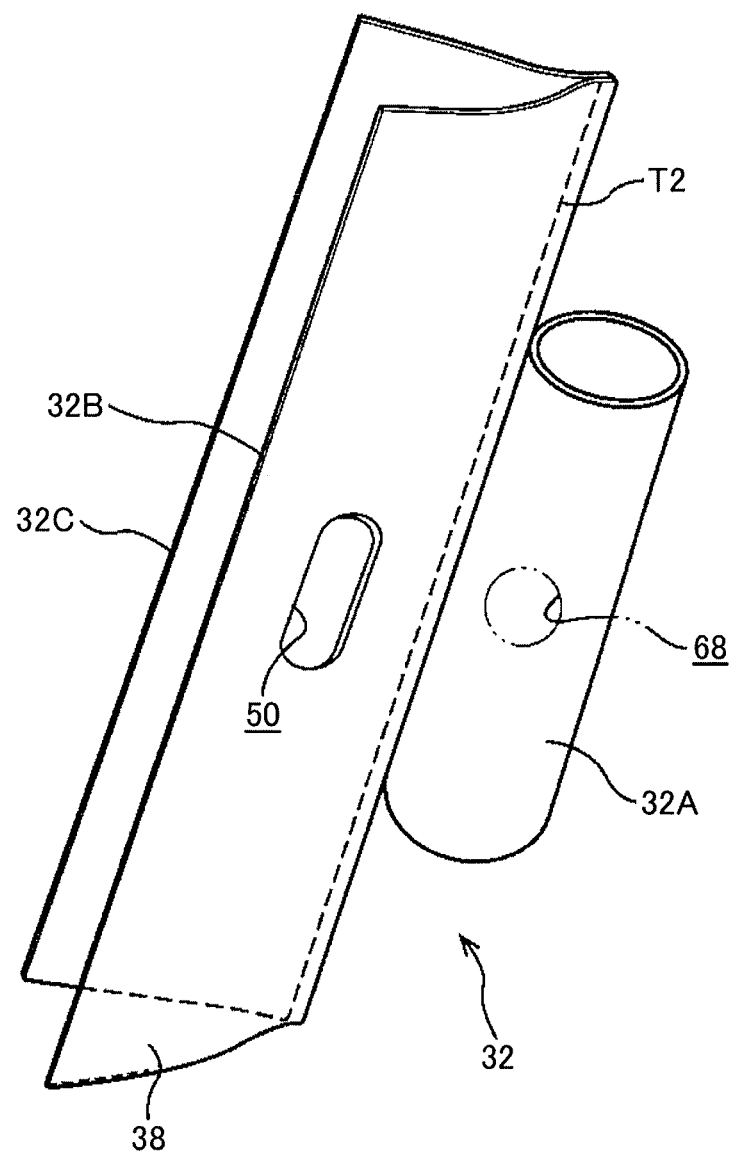
FIG. 4 is a perspective view of a front-rear partition cloth that is a component of the side airbag according to the first embodiment.

Meanwhile, the front-rear partition cloth 32 is formed by folding a single base fabric 38, which is cut out in an H-shape from the same cloth material as that of the bag body 30, into two, and stitching this base fabric at the seam T2 as shown in FIG. 4. This front-rear partition cloth 32 integrally includes a cylindrical rectifying portion 32A, and a left partition 32B and a right partition 32C that are a pair of front extending portions. Each of the left partition 32B and the right partition 32C is formed in a long web shape whose longitudinal direction coincides with a longitudinal direction of the bag body 30, and longitudinal edges thereof are stitched to each other at the seam T2.

An axial direction of the rectifying portion 32A extends along the longitudinal direction of the left partition 32B and the right partition 32C, and is integrally connected to a longitudinal intermediate portion between the left partition 32B and the right partition 32C. This rectifying portion 32A is formed to have a shorter length along the longitudinal direction of the bag body 30 than those of the left partition 32B and the right partition 32C. This rectifying portion 32A is disposed at an intermediate portion in the up-down direction of a rear end of the bag body 30, and is stitched to the rear end of the bag body 30 at the seams T3, T4 as shown in FIG. 3. This rectifying portion 32A is a rectifying cloth (rectifying member) for rectifying gas from the aforementioned inflator 24, and is composed of part of the front-rear partition cloth 32, thus having flexibility.

The other longitudinal edge of the left partition 32B is stitched to an intermediate portion in the front-rear direction of one side portion 34A of the base fabric 34 at the seam T5 extending in the longitudinal direction of the bag body 30. The other longitudinal edge of the right partition 32C is stitched to an intermediate portion in the front-rear direction of the other side portion 34B of the base fabric 34 at the seam T6 extending in the longitudinal direction of the bag body 30.

The front-rear partition cloth 32 having the aforementioned configuration partitions the inside of the bag body 30 into a front bag section 40 and a rear bag section 42. The rectifying portion 32A of the front-rear partition cloth 32 is disposed in the rear bag section 42, and the inside of the rear bag section 42 is partitioned into a left chamber 46 and a right chamber 48 by the left partition 32B and the right partition 32C branched into two from an outer periphery of the rectifying portion 32A. The left chamber 46 is communicated with the inside of the front bag section 40 (front chamber) through a communicating port 50 formed in the left partition 32B, and the right chamber 48 is communicated with the inside of the front bag section 40 through a communicating port 52 formed in the right partition 32C.

The aforementioned inflator 24 is disposed inside the above rear bag section 42. The inflator 24 is a so-called cylinder-type inflator, and is formed in a cylindrical shape. This inflator 24 is housed inside the rectifying portion 32A in such a manner that the axial direction of the inflator 24 extends along the up-down direction of the seat back 16.

From an outer periphery of the inflator 24, a pair of upper and lower stud bolts 54 inwardly project in the vehicle width direction (inwardly in the seat width direction). These stud bolts 54 extend through the rectifying portion 32A and the bag body 30, and also through a fixed bracket 56 disposed inside the side support section 16B, and nuts 58 are screwed onto front ends of the stud bolts 54. Through this, the inflator 24 is fastened together with the side airbag 22 to be fixed to the fixed bracket 56 (so-called side-fastening). This fixed bracket 56 is fixed to a seat frame member 60 (herein, wire) disposed inside the side support section 16B by means such as welding. It may be configured that the stud bolts projecting from the outer periphery of the inflator 24 in the vehicle rearward direction extend through the rectifying portion 32A, the bag body 30, and the fixed bracket 56, and are then screwed to the nuts 58 (so-called back-fastening).

As shown in FIG. 1, a side impact ECU 62 mounted in the vehicle is electrically connected to the above inflator 24. A side impact sensor 64 to detect a side impact is electrically connected to the side impact ECU 62. The side impact ECU 62 is configured to actuate the inflator 24 when detecting (avoidance of) a side impact based on a signal from the side impact sensor 64. If a pre-crush sensor to foresee (predict) a side impact is electrically connected to the side impact ECU 62, the inflator 24 may be configured to be actuated when the side impact ECU 62 foresees the side impact based on a signal from the pre-crush sensor.

In the side airbag device 10 as above configured, when the inflator 24 is actuated, gas is radially injected from a gas injection port disposed at an upper end or a lower end of the inflator 24. The gas injected from the gas injection port is distributed from upper and lower apertures of the rectifying portion 32A into the left and right chambers 46, 48 of the rear bag section 42. Part of the gas distributed into the left and right chambers 46, 48 is supplied through the communicating ports 50, 52 into the front bag section 40 (see Arrows G1, G2 of FIG. 3). Through this, the bag body 30 of the side airbag 22 inflates and deploys frontward of the side support section 16B, that is, between the occupant P and the door trim 28 of the side door 26.

In this case, the gas from the inflator 24 is supplied via the left and right chambers 46, 48 of the rear bag section 42 into the front bag section 40, and thus an inner pressure of the rear bag section 42 becomes higher than an inner pressure of the front bag section 40. It may be configured to provide a pair of left and right apertures that communicate the left and right chambers 46, 48 with an inside of the rectifying portion 32A to an intermediate portion in the axial direction of the rectifying portion 32A (see an aperture 68 indicated by a two-dot chain line in FIG. 4). Through this, it is possible to promote inflation and deployment of the rear bag section 42 so as to bring the rear bag section 42 to inflate and deploy at an earlier stage.

In the inflation and deployment state of the side airbag 22, as shown in FIG. 1, the front bag section 40 and the rear bag section 42 are arranged in the vehicle front-rear direction so that a front edge 43 (front end edge) of the rear bag section 42 extends along the up-down direction of the seat back 16. This front edge 43 of the rear bag section 42 is defined to face a central portion in the front-rear direction of a shoulder region S, a chest region C, an abdominal region B, and a lumbar region L of the occupant P in position. Through this, the front part (front half) of the shoulder region S, the chest region C, the abdominal region B, and the lumbar region L of the occupant P is restrained by the front bag section 40, and the rear part (rear half) of the shoulder region S, the chest region C, the abdominal region B, and the lumbar region L of the occupant P is restrained by the rear bag section 42. It should be noted that the up-down direction of the seat back 16 in the present embodiment denotes a direction extending along the back rest 16A of the seat back 16 in a side view (as viewed in the vehicle width direction).

As shown in FIG. 1, if the inflation and deployment state of the side airbag 22 is viewed from the vehicle width direction, the front-rear partition cloth 32 is defined in such a manner that a lower portion of the front edge 43 of the rear bag section 42 is located at a more vehicle rearward position than a front edge 17 of the side support section 16B. Through this, it is configured that at an equivalent height to that of an upper surface 28A1 of an armrest 28A provided to the door trim 28 of the side door 26, the front edge 43 of the rear bag section 42 is located at a more vehicle rearward position than the front edge 17 of the side support section 16B.

In addition, as shown in FIG. 3, it is configured that if the inflation and deployment state of the side airbag 22 is viewed in a plan sectional view, the left chamber 46 and the right chamber 48 of the rear bag section 42 are arranged side by side in the vehicle width direction. The left partition 32B and the right partition 32C that respectively partition the left and right chambers 46, 48 from the front bag section 40 extend from the rectifying portion 32A to a front position of the bag body 30 in a manner as to be branched into two and arranged side by side in the vehicle width direction. Through this, an intermediate portion in the vehicle width direction of a front surface 42A of the rear bag section that is composed of the left partition 32B and the right partition 32C is recessed toward the vehicle rearward direction to be a recessed portion 70 (valley). This recessed portion 70 may also be deemed to be formed by a central portion in the vehicle width direction of a rear surface of the front bag section 40 projecting toward the vehicle rearward direction, and this recessed portion 70 extends along the up-down direction of the side airbag 22. Specifically, in the present embodiment, the front portion of the rear bag section 42 is branched into two left and right parts, and thus a pair of left and right front edges 43 are formed at the front end of the rear bag section 42.

(Operation and Effects)

Next, operation and effects of the first embodiment will be described.

In the above configured vehicle side airbag device 10, when the side impact ECU 62 detects a side impact based on the signal from the side impact sensor 64, the inflator 24 is actuated by the side impact ECU 62. The gas injected from the gas injection port of the inflator 24 is then supplied into the front bag section 40 and the rear bag section 42 of the side airbag 22 so that the side airbag 22 inflates and deploys. Through this, the front part of the shoulder region S, the chest region C, the abdominal region B, and the lumbar region L of the occupant P is restrained by the front bag section 40, and the rear part of the shoulder region S, the chest region C, the abdominal region B, and the lumbar region L of the occupant P is restrained by the rear bag section 42.

In this case, it is possible to bring the rear bag section 42 equipped with the inflator 24 thereinside to inflate and deploy earlier at a higher pressure than the front bag section 40. Hence, it is possible to reduce load applied onto the front part of the chest region C and the abdominal region B having a relatively low load resistance, and also effectively restrain the rear part of the chest region C and the abdominal region B (part of the back) having a relatively high load resistance (see FIG. 5(A)). As a result, it is possible to enhance the initial occupant restraint performance by the side airbag 22.

In addition, in the present embodiment, in the inflation and deployment state of the side airbag 22, the front-rear partition cloth 32 partitioning the bag body 30 into the front bag section 40 and the rear bag section 42 brings the intermediate portion in the vehicle width direction of the front surface 42A of the rear bag section 42 to be recessed toward the vehicle rear direction. Through this, even if the occupant is out of position frontward of the side support section 16B, it is possible to prevent or suppress influence from the rear bag section 42 to the occupant.

Figure 5A:
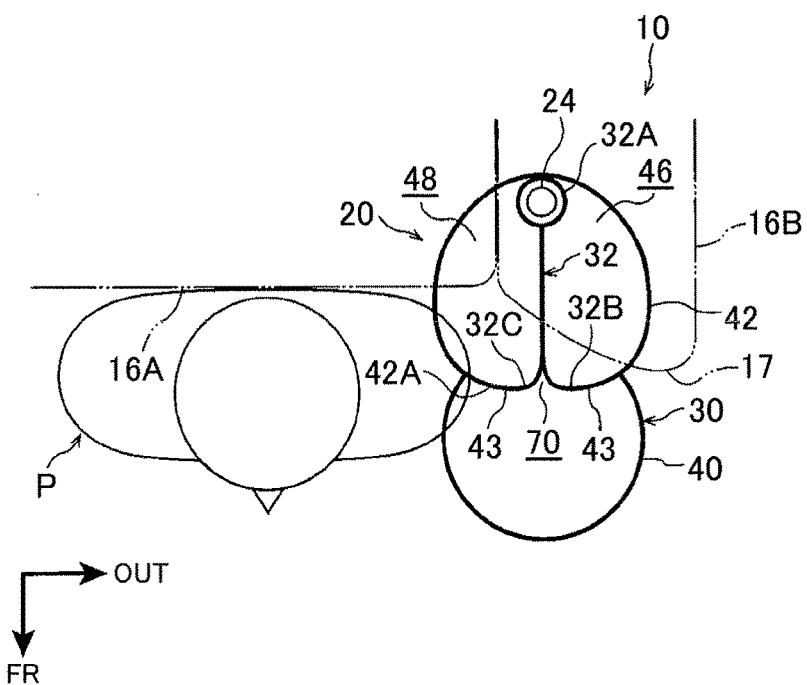
FIG. 5A is a schematic plan sectional view of an occupant restraint state by the side airbag according to the first embodiment as viewed from above the vehicle.
Figure 5B:
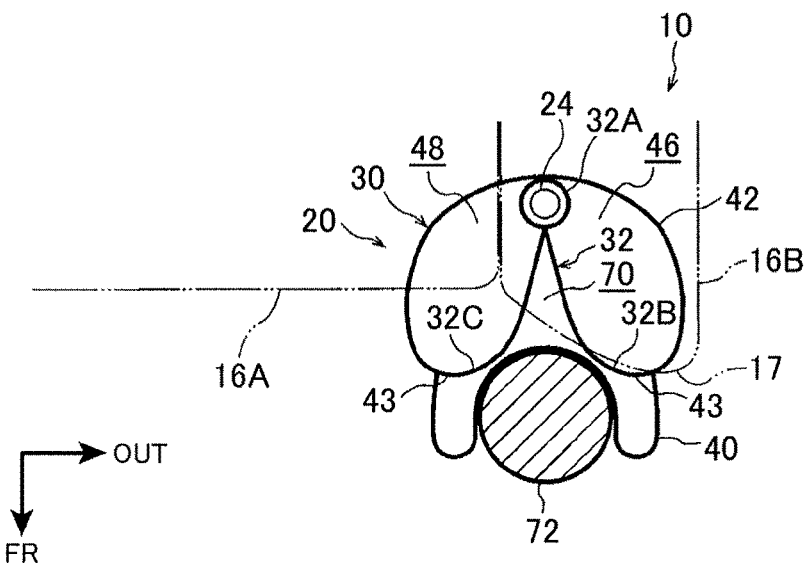
FIG. 5B is a schematic plan sectional view of a state in which the side airbag according to the first embodiment inflates and deploys while a luggage is located frontward of a side support section as viewed from above the vehicle.

In the present embodiment, the rear bag section 42 is partitioned into the left and right chambers 46, 48 by the left partition 32B and the right partition 32C that are arranged side by side in the vehicle width direction in the inflation and deployment state of the side airbag 22. Hence, if the inflating and deploying left and right chambers 46, 48 interfere with the occupant, luggage, or the like located frontward of the side support section 16B (see a luggage 72 as shown in FIG. 5(B)) from the vehicle rearward direction, the left and right chambers 46, 48 move apart from each other, thereby reducing influence applied to the occupant, the luggage, or the like.

Figure 6A:
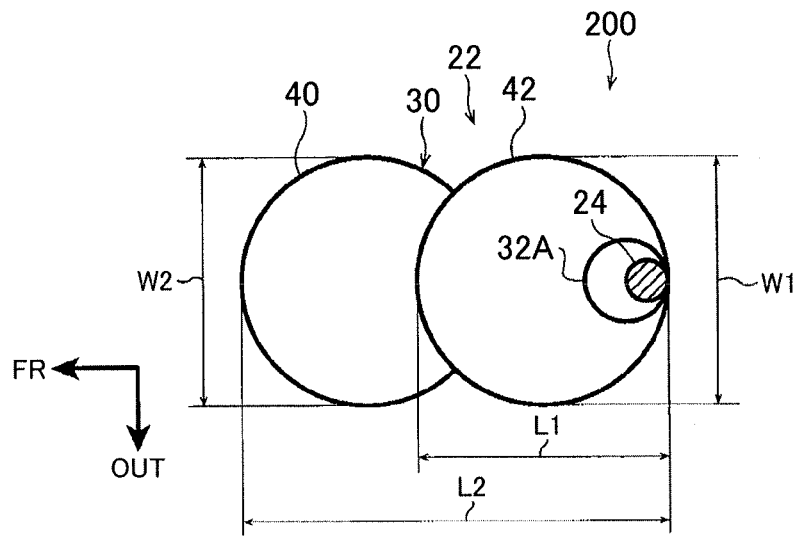
FIG. 6A is a schematic plan sectional view showing an inflation and deployment state of a side airbag according to a comparative example.
Figure 6B:
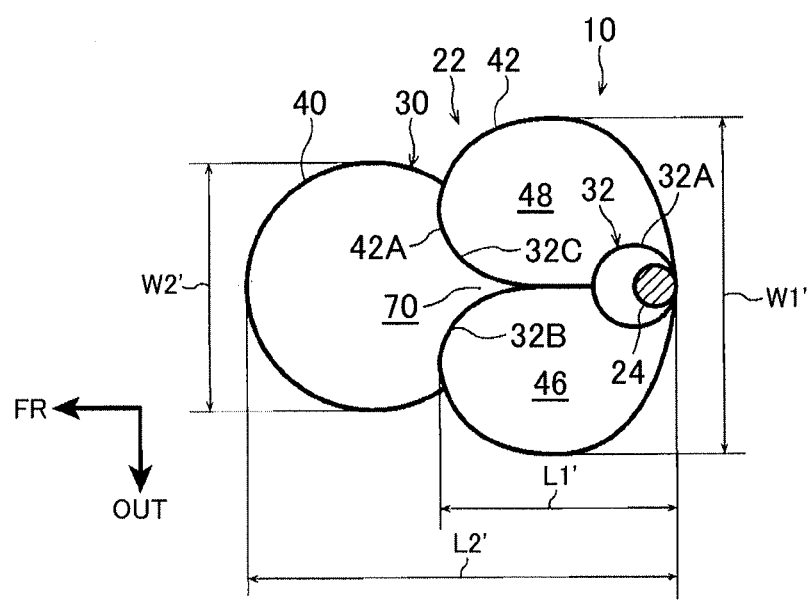
FIG. 6B is a schematic plan sectional view showing the inflation and deployment state of the side airbag according to the present embodiment.

In the present embodiment, the left and right chambers 46, 48 of the rear bag section 42 respectively inflate to be arranged side by side in the vehicle width direction (vehicle left-right direction). Hence, compared with the case of configuring the rear bag section 42 by a single chamber (see a comparative example 200 as shown in FIG. 6(A)), it is possible to increase an inflation thickness in the vehicle width direction of the rear bag section 42. Specifically, in FIG. 6(A) and FIG. 6(B), if L1=L1' and L2=L2' are satisfied, W1<W1' can be attained. It should be noted that W2=W2' is satisfied in FIG. 6(A) and FIG. 6(B).

In other words, while securing the inflation thickness W1' in the vehicle width direction of the rear bag section 42, it is possible to reduce the inflation thickness L1' in the vehicle front-rear direction of the rear bag section 42. Accordingly, while securing the occupant restraint performance by the rear bag section 42, it is possible to further effectively suppress influence from the rear bag section 42 to the occupant out of position.

Figure 7A:
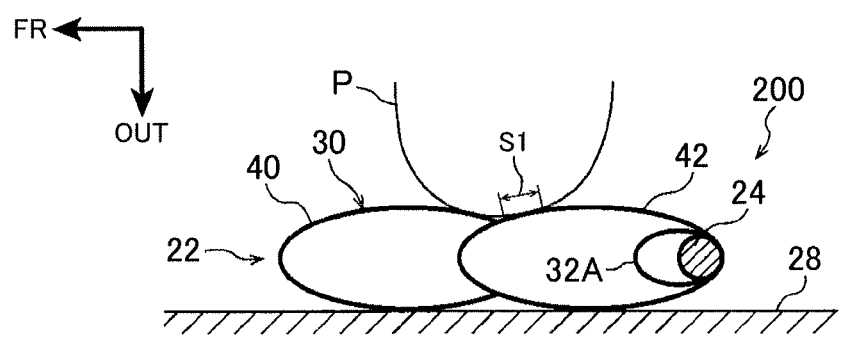
FIG. 7A is a schematic plan sectional view showing a state in which the side airbag according to the comparative example is pressed between an occupant and a door trim.
Figure 7B:
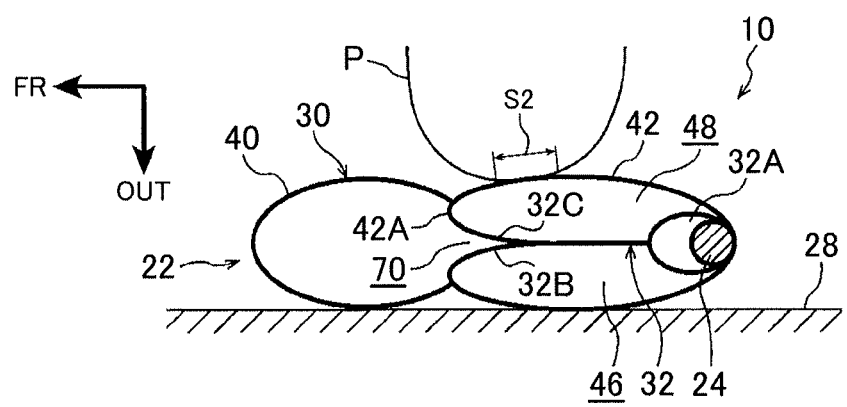
FIG. 7B is a schematic plan sectional view showing a state in which the side airbag according to the present embodiment is pressed between the occupant and the door trim.

In the present embodiment, it is possible to increase the inflation thickness of the rear bag section 42, thereby increasing a contact area between the rear bag section 42 and the occupant P. Specifically, when the rear bag section 42 is pushed and deformed between the occupant P and the door trim 28, amount of pushed deformation of the rear bag section 42 becomes greater in the present embodiment as shown in FIG. 7(B) than that of the comparative example 200 (the same as that in FIG. 6(A)) as shown in FIG. 7(A). Consequently, in the present embodiment, a boundary between the rear bag section 42 and the front bag section 40 is displaced to a more vehicle frontward position than that of the comparative example 200, thus increasing the contact area between the rear bag section 42 and the occupant P (S1<S2 in FIG. 7(A) and FIG. 7(B)). Accordingly, it is possible to more effectively restrain the occupant P by the rear bag section 42.

In addition, in the present embodiment, inside the rear bag section 42, there is provided the rectifying portion 32A that distributes the gas from the inflator 24 to the left and right chambers 46, 48. The gas distributed to the left and right chambers 46, 48 is supplied through the left and right communicating ports 50, 52 formed in the front-rear partition cloth 32 into the front bag section 40. Through this, it is possible to bring the rear bag section 42 and the front bag section 40 to inflate and deploy in well balance, so that the deployment behavior of the bag body is stabilized.

In addition, the above rectifying portion 32A is composed of part of the front-rear partition cloth 32; thus the structure of the side airbag 22 can be simplified. It is also possible to prevent the front-rear partition cloth 32 including the rectifying portion 32A from becoming bulky, so that the side airbag 22 can be compactly folded up. Accordingly, it is possible to enhance mountability of the side airbag module 20 to the side support section 16B.

Since the inflator 24 is housed inside the rectifying portion 32A formed in a cylindrical shape having flexibility, the rectifying portion 32A inflates by a pressure of the gas generated from the inflator 24. Hence, the front surface 42A of the rear bag section formed of the front-rear partition cloth 32 can be pulled toward the inflator 24 (vehicle rearward direction). As a result, it is possible to further effectively suppress influence from the rear bag section 42 to the occupant out of position.

Furthermore, in the present embodiment, if the inflation and deployment state of the side airbag 22 is viewed from the vehicle width direction, the front-rear partition cloth 32 is defined in such a manner that the lower portion of the front edge 43 of the rear bag section 42 is located at a more vehicle rearward position than the front edge 17 of the side support section 16B. Hence, compared with the case in which the entire front edge 43 of the rear bag section 42 projects to a more vehicle frontward position than the front edge 17 of the side support section 16B, it is possible to reduce influence from the rear bag section 42 (herein, lower portion) to the occupant out of position.

In the present embodiment, at a height equivalent to a height of the upper surface 28A1 of the armrest 28A disposed to the side door 26, the front edge 43 of the inflating and deploying rear bag section 42 is located at a more vehicle rearward position than the front edge 17 of the side support section 16B. Hence, even if the side airbag 22 inflates and deploys in a state in which the occupant leans his or her head or the like against the upper surface 28A1 of the armrest 28A, it is possible to prevent or suppress influence from the rear bag section 42 to this occupant.

In the present embodiment, since the front-rear partition cloth 32 is provided in such a manner that the front edge 43 of the inflating and deploying rear bag section 42 extends along the up-down direction of the seat back 16, it is possible to prevent part of the rear bag section 42 from greatly projecting locally from the side support section 16B toward the vehicle frontward direction. In addition, in the present embodiment, it is only required to provide the front-rear partition cloth 32 that can be formed by a single base fabric 38 inside the bag body 30, and thus it is possible to attain the above various effects with an extremely simple configuration.

In the above first embodiment, it may be configured that at least one of the front bag section 40 and the rear bag section 42 is provided with a vent hole, and the gas supplied into the at least one section is exhausted to the outside of the side airbag 22 through the vent hole. Through this, it is possible to prevent crashed remainder from being caused to the at least one section.

In the above first embodiment, the left and right chambers 46, 48 of the rear bag section 42 may be formed to be left-right asymmetric. In such a configuration, it is possible to prevent the left and right seams T5, T6 or the like at which the front-rear partition cloth 32 is stitched to the base fabric 34 of the bag body 30 from being overlaid on each other when the side airbag 22 is folded up; therefore, it is possible to compactly fold up the side airbag 22.

Next, other embodiments of the present invention will be explained. The same reference numerals are used for configurations and operations that are basically the same as those of the aforementioned first embodiment, and description thereof will be omitted.

Second Embodiment

Figure 8:
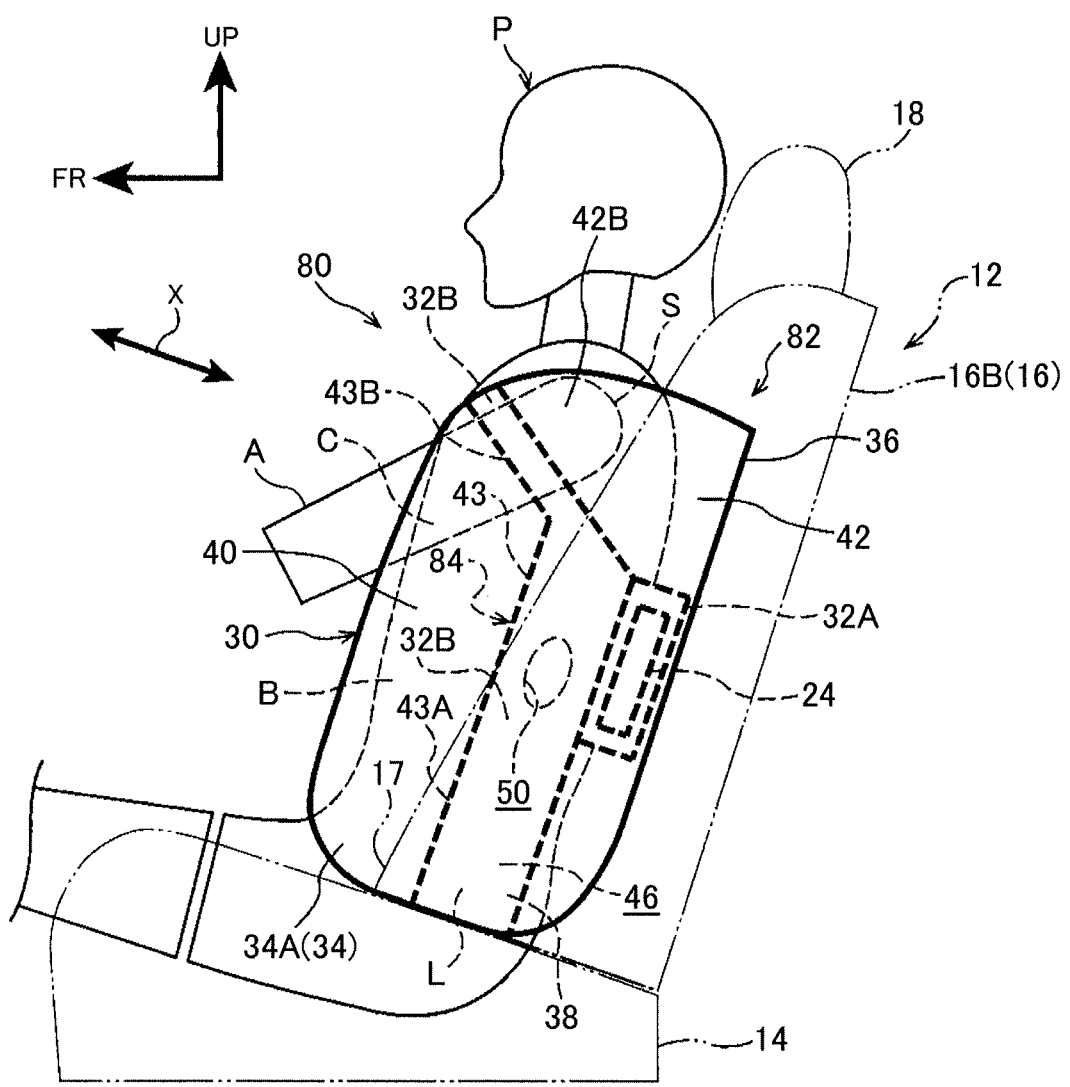
FIG. 8 is a side view of a vehicle seat according to a second embodiment of the present invention, and is a drawing of a state in which a side airbag of a vehicle side airbag device inflates and deploys.

In FIG. 8, the vehicle seat 12 and a vehicle side airbag device 80 according to the second embodiment of the present invention are shown in a side view corresponding to FIG. 1. In this side airbag device 80, the configuration of a side airbag 82 is different from that of the side airbag 22 according to the first embodiment. In this side airbag 82, a front-rear partition cloth 84 (front-rear partition) is formed in such a manner that the front edge 43 of the inflating and deploying rear bag section 42 is composed of a vertical extending portion 43A extending along the up-down direction of the seat back 16, and a tilting portion 43B obliquely upwardly extending in the vehicle frontward direction from an upper end of the vertical extending portion 43A.

Figure 9:
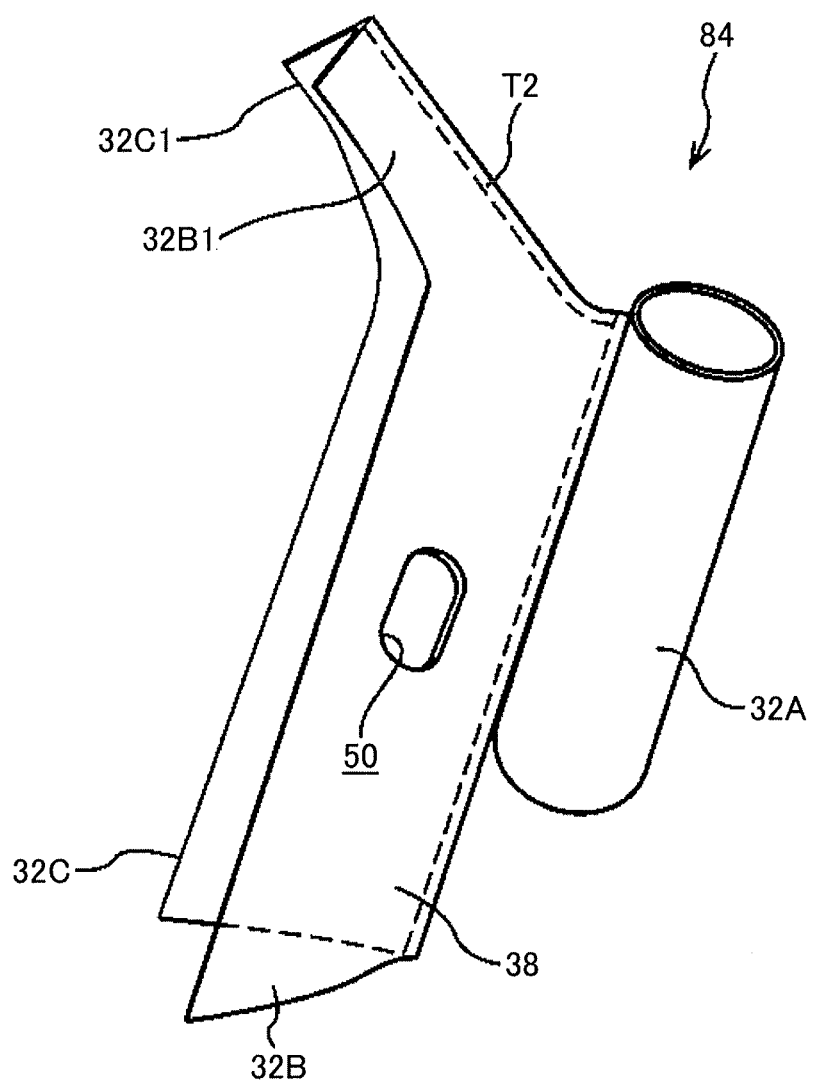
FIG. 9 is a perspective view of a front-rear partition cloth that is a component of the side airbag according to the second embodiment.

Specifically, as shown in FIG. 9, in this front-rear partition cloth 84, end portions of the left partition 32B and the right partition 32C upper than the rectifying portion 32A are defined to be frontward extending portions 32B1, 32C1 that tiltingly extend in an opposite direction to the rectifying portion 32A. Respective width dimensions of the left partition 32B and the right partition 32C are reduced in these frontward extending portions 32B1, 32C1. These frontward extending portions 32B1, 32C1 are respectively stitched to one side portion 34A and the other side portion 34B of the base fabric 34 at the seams T5, T6 (not shown in FIG. 8, FIG. 9).

In the side airbag 82 in which the inside of the bag body 30 is partitioned by the front-rear partition cloth 84, a front extending portion 42B extending above the front bag section 40 is formed in an upper portion of the rear bag section 42. The upper portion of the rear bag section 42 including this front extending portion 42B is not sectioned (not partitioned) by the left chamber 46 and the right chamber 48.

As shown in FIG. 8, in the inflation and deployment state of the side airbag 82, the front extending portion 42B disposed to the upper portion of the rear bag section 42 extends from a lateral portion of the shoulder region S of the occupant P in the vehicle frontward direction so as to be located above the front bag section 40. Hereinafter, the side airbag 82 in the inflation and deployment state will be described in detail.

In this side airbag 82, the inflation width of the front extending portion 42B is defined to be smaller than the inflation with of the front bag section 40. Accordingly, the inward surface in the vehicle width direction of the upper portion of the front bag section 40 is configured to be an upper arm pushing surface that is curved or tilts in a manner as to extend more upward as it extends more outward in the vehicle width direction (extend more outward in the vehicle width direction as it extends more upward).

The tilting portion 43B is so provided as to obliquely upwardly extend in the frontward direction of the seat back 16 from the upper end of the vertical extending portion 43A. Specifically, this tilting portion 43B is more upwardly inclined as it extends toward the frontward direction of the seat back 16, relative to the front-rear direction of the seat back 16, that is, a direction vertical to the up-down direction (direction along Arrow X of FIG. 8) of the seat back 16 in a side view of the seat. An angle of inclination θ of the tilting portion 43B relative to the front-rear direction of the seat back 16 is preferably defined to be within a range of 30° to 60°, and more preferably within a range of 40° to 50°.

If the inflation and deployment state of the side airbag 82 is viewed from the vehicle width direction, this tilting portion 43B is so defined as to be located in the vicinity of a center between the center of the shoulder region S (herein, an axial center of a bolt disposed at the shoulder region S of the dummy P) and a longitudinal central portion of an upper arm region A (a position of a center of gravity or a position in the vicinity of the center of gravity of the upper arm region) of the occupant P. In the vicinity of the tilting portion 43B, the inward surface in the vehicle width direction of the side airbag 82 is recessed outward in the vehicle width direction so as to be a recessed portion. This recessed portion obliquely upwardly extends in the frontward direction of the seat back 16 along the tilting portion 43B.

In the present embodiment, the configurations other than the above are the same as those of the aforementioned first embodiment. Accordingly, the same operational effect is attained as that of the aforementioned first embodiment. In addition, in the present embodiment, the front extending portion 42B restraining the shoulder region S of the occupant P is provided to the upper portion of the rear bag section 42. Through inflation and deployment of this front extending portion 42B at an earlier stage, it is possible to restrain the shoulder region S of the occupant P at an earlier stage. Furthermore, this front extending portion 42B is sectioned (partitioned) from the front bag section 40 along the tilting portion 43B obliquely upwardly extending in the frontward direction of the seat back 16 from the upper end of the vertical extending portion 43A, and inflates and deploys above the front bag section 40. By defining the front extending portion 42B in this manner, it is possible to suppress increase in volume of the rear bag section 42 as well as preferably bring the front extending portion 42B, that is, the upper portion of the rear bag section 42 at a high pressure to face the shoulder region S of the occupant P. As a result, it is possible to effectively restrain the rear part of the chest region C, the abdominal region B, and the lumbar region L, and the shoulder region S by the rear bag section 42, thereby enhancing the initial occupant restraint performance by the side airbag 82.

Furthermore, the inward surface in the vehicle width direction of the inflating and deploying front bag section 40 is curved in such a manner that the upper portion thereof extends more outward in the vehicle width direction as it extends more upward. Accordingly, the side airbag 82 and the occupant P relatively come closer to each other due to impact of the side impact, so that the above curved surface comes into sliding contact with the upper arm region A of the occupant P, thereby generating a force to push up the upper arm region A. As a result, the upper arm region A is pushed upward of the front bag section 40, and is restrained by the front extending portion 42B. Through this, it is possible to suppress intervention of the upper arm region A between the chest region C of the occupant P and the side airbag 82, thereby reducing load onto the chest region C.

Moreover, the width dimensions of the left partition 32B and the right partition 32C are respectively reduced in the frontward extending portions 32B1, 32C1. Through this, the inflation width in the vehicle width direction at the upper end of the front bag section 40 can be sufficiently smaller than the inflation width in the vehicle width direction in the intermediate portion in the up-down direction of the front bag section 40. As a result, the upper portion of the inward surface in the vehicle width direction of the front bag section 40 can be greatly curved, thereby increasing the push-up force to be acted on the upper arm region A.

Furthermore, as aforementioned, the above front extending portion 42B extends from the lateral position of the shoulder region S of the occupant P toward the vehicle frontward direction so as to be located above the front bag section 40. Hence, for example, even if the form of the side impact is a so-called oblique side impact, and even if the occupant P experiences inertial movement in the obliquely frontward direction of the vehicle, it is possible to prevent the shoulder region S of the occupant P from being out of the front extending portion 42B. Through this, regardless of the form of the side impact, it is possible to preferably restrain the shoulder region S of the occupant P by the side airbag 82, thereby maintaining the restraint of the shoulder region S until a latter half of the impact in a preferable manner.

The upper portion of the rear bag section 42 including the front extending portion 42B is not partitioned into the left and right chambers 46, 48. Hence, compared with the case of partitioning the upper portion of the rear bag section 42 into the left and right chambers 46, 48, it is possible to reduce the inflation thickness in the vehicle width direction in the upper portion of the rear bag section 42. Through this, it is possible to bring the upper portion of the rear bag section 42 to preferably inflate and deploy in a small gap between the shoulder region S of the occupant P and a lateral part of the vehicle body (side door 26, herein), for example.

Third Embodiment

Figure 10:
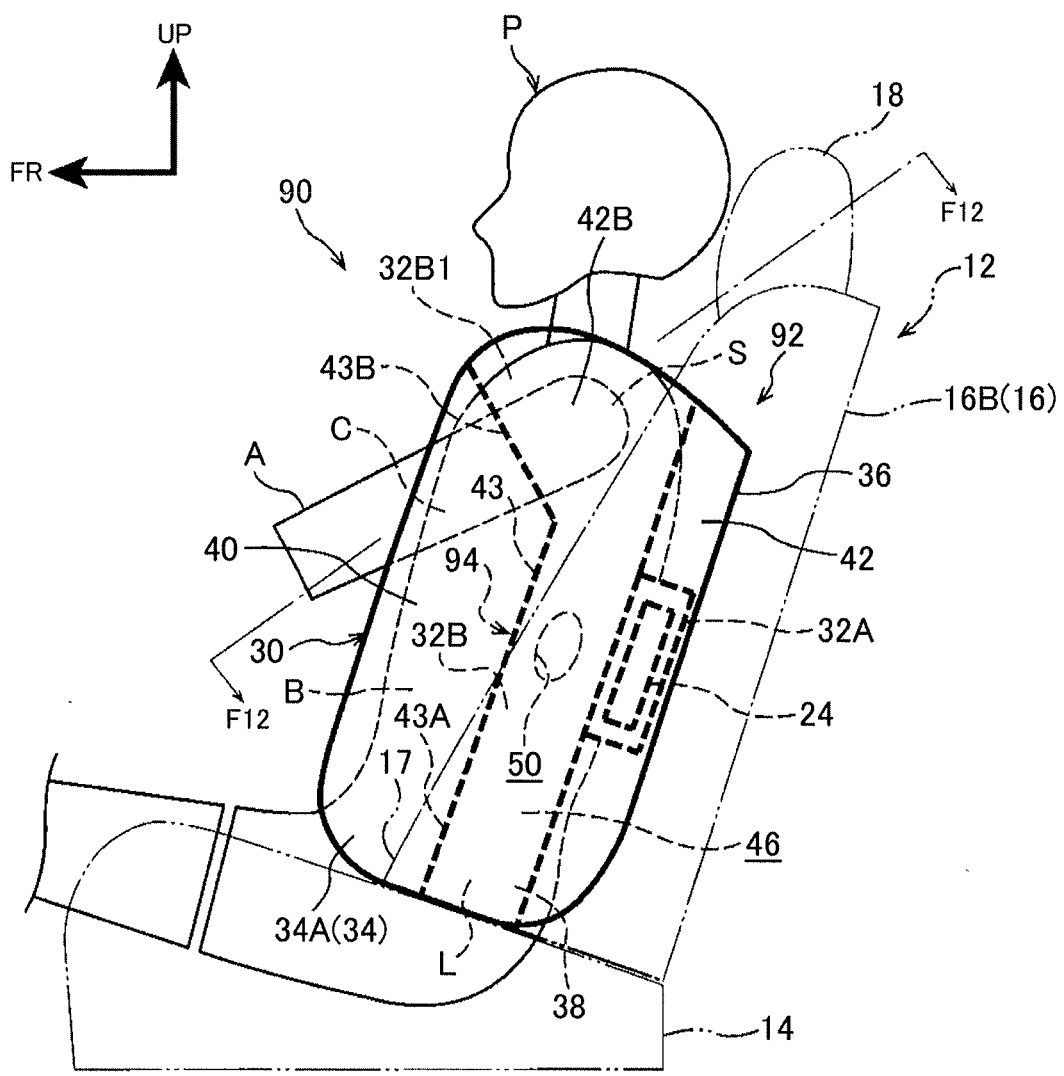
FIG. 10 is a side view of a vehicle seat according to a third embodiment of the present invention, and is a drawing of a state in which a side airbag of a vehicle side airbag device inflates and deploys.

In FIG. 10, the vehicle seat 12 and a vehicle side airbag device 90 according to the third embodiment of the present invention is shown in a side view corresponding to FIG. 1. In this vehicle side airbag device 90, the configuration of a side airbag 92 is different from that of the side airbag 22 according to the aforementioned first embodiment.

In this side airbag 92, a front-rear partition cloth 94 (front-rear partition) is formed in such a manner that the front edge 43 of the inflating and deploying rear bag section 42 is composed of the vertical extending portion 43A extending along the up-down direction of the seat back 16 and the tilting portion 43B obliquely upwardly extending in the vehicle frontward direction from the upper end of the vertical extending portion 43A. This point is the same as that of the side airbag 82 according to the aforementioned second embodiment.

Figure 11:
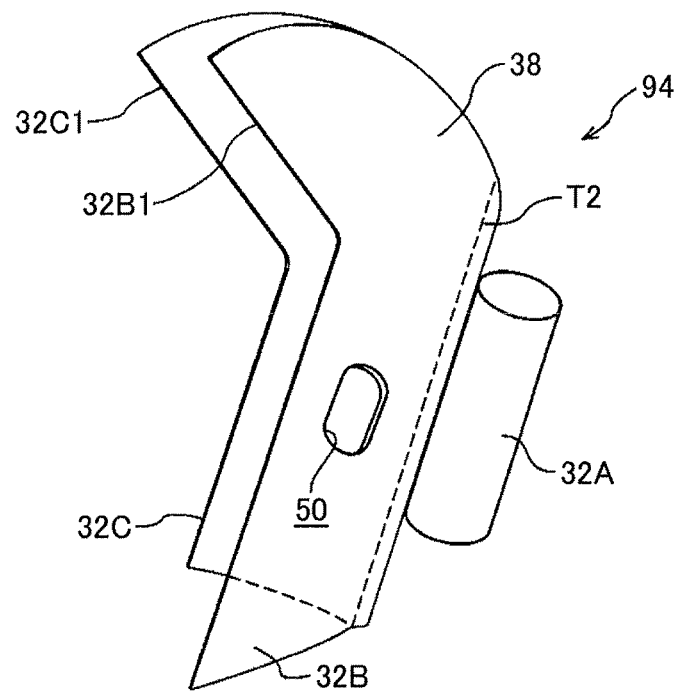
FIG. 11 is a perspective view of a front-rear partition cloth that is a component of the side airbag according to the third embodiment.
Figure 12:
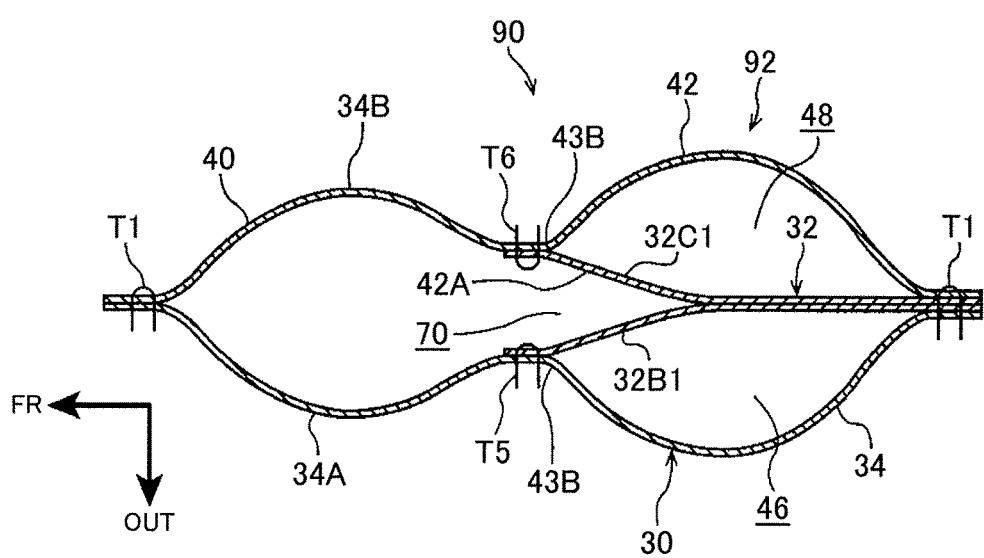
FIG. 12 is an enlarged sectional view showing a section taken along line F12-F12 of FIG. 10.

However, in this side airbag 92, the left partition 32B and the right partition 32C of the front-rear partition cloth 94 extend to the upper edge of the bag body 30, and are stitched to the bag body 30 at the outer peripheral seam T1 (not shown in FIG. 10, FIG. 11). Through this, the left chamber 46 and the right chamber 48 further extend to the upper portion of the rear bag section 42 so that the front extending portion 42B is sectioned (partitioned) into the left and right chambers 46, 48 as shown in FIG. 12. In this side airbag 92, the upper portion of the bag body 30 further extends upward; therefore, the front extending portion 42B is enlarged more than that of the aforementioned second embodiment.

In this embodiment, as similar to the aforementioned second embodiment, the rear bag section 42 includes the front extending portion 42B; thus, the same operational effect as that of the second embodiment can be attained. In addition, in this embodiment, the front extending portion 42B is sectioned into the left and right chambers 46, 48; therefore, even if the side airbag 92 inflates and deploys in a state in which the head or the like of the occupant is present frontward of the upper portion of the side support section 16B (at a height at which the front extending portion 42B inflates and deploys), the left and right chambers 46, 48 move apart from each other, thereby reducing influence applied to the occupant. Moreover, this effect can also be attained even in the case of enlarging the front extending portion 42B, thus enhancing the restraint performance of the shoulder region S by the front extending portion 42B.

In addition, the upper portion of the rear bag section 42 including the front extending portion 42B is sectioned into the left and right chambers 46, 48. Hence, compared with the case in which the upper portion of the rear bag section 42 is not sectioned into the left and right chambers 46, 48, it is possible to increase the inflation thickness in the vehicle width direction in the upper portion of the rear bag section 42. Accordingly, it is possible to further enhance the restrain performance of the shoulder region S.

Fourth Embodiment

Figure 13:
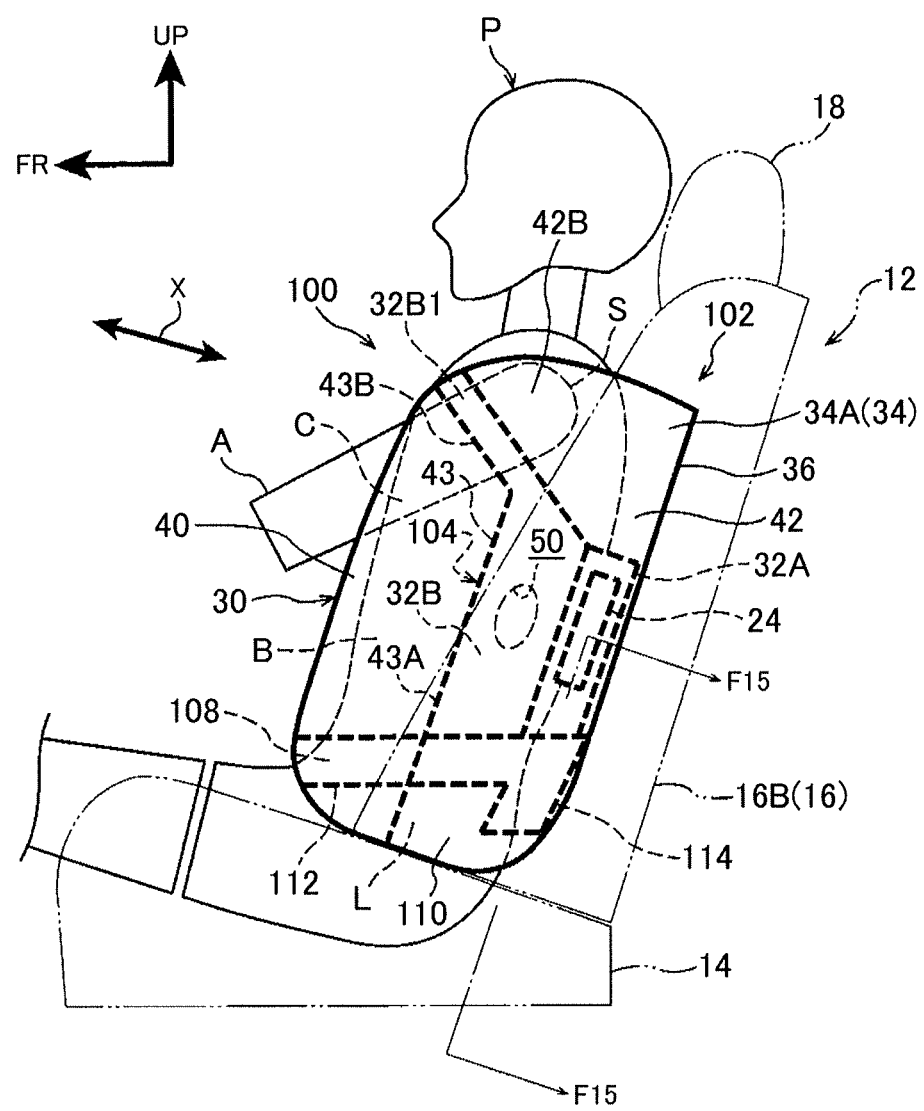
FIG. 13 is a side view of a vehicle seat according to a fourth embodiment of the present invention, and is a drawing of a state in which a side airbag of a vehicle side airbag device inflates and deploys.
Figure 14:
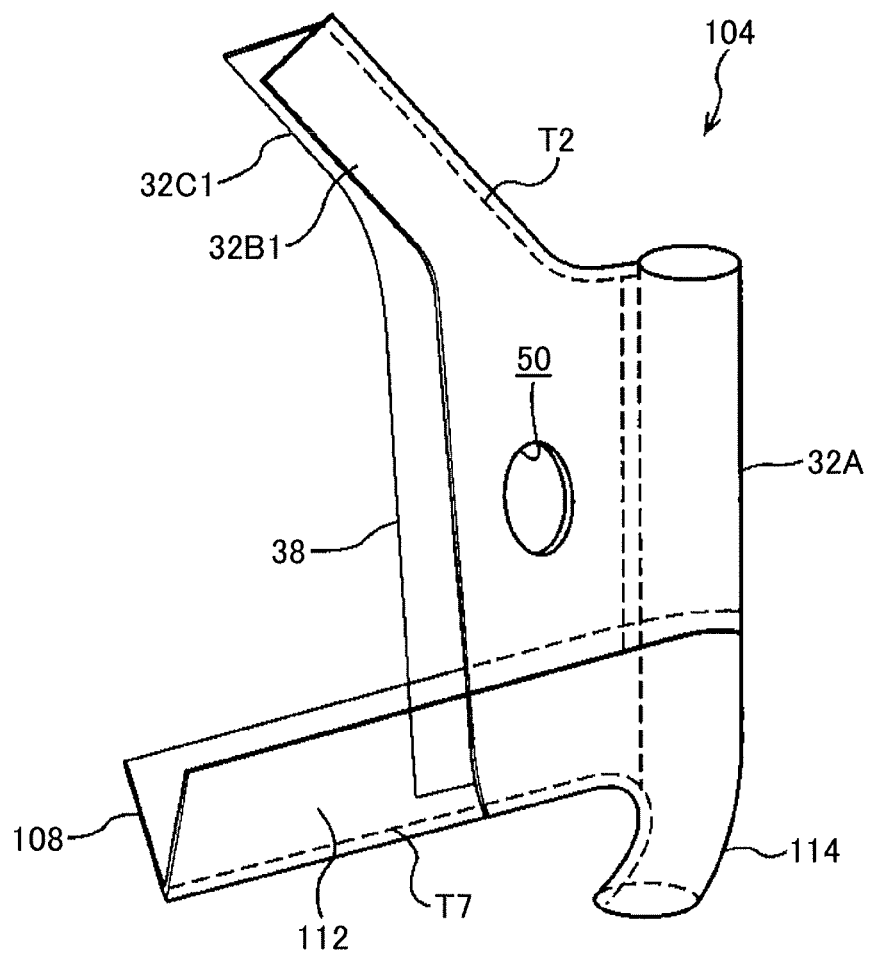
FIG. 14 is a perspective view of a front-rear partition cloth that is a component of the side airbag according to the fourth embodiment.

In FIG. 13, the vehicle seat 12 and a vehicle side airbag device 100 according to the fourth embodiment of the present invention is shown in a side view corresponding to FIG. 1. In this side airbag device 100, the configuration of a side airbag 102 is different from that of the side airbag 22 according to the aforementioned first embodiment.

This side airbag 102 includes a front-rear partition cloth 104 (front-rear partition) having the same configuration as that of the front-rear partition cloth 84 according to the aforementioned second embodiment. This front-rear partition cloth 104 is formed in such a manner that the front edge 43 of the inflating and deploying rear bag section 42 is composed of the vertical extending portion 43A extending along the up-down direction of the seat back 16 and the tilting portion 43B obliquely upwardly extending in the vehicle frontward direction from the upper end of the vertical extending portion 43A.

However, in this front-rear partition cloth 104, the left partition 32B and the right partition 32C do not reach the lower end of the bag body 30, and the lower portion of the bag body 30 is partitioned by an up-down partition cloth 108 (up-down partition) into the front and rear bag sections 40, 42 and a lower bag section 110. This up-down partition cloth 108 is formed in such a manner that a base fabric 112 formed in a substantially T-shape (see FIG. 15) is folded into two, and a lower edge thereof is stitched at a seam T7, and a pair of longitudinal edges thereof on the opposite side to the seam T7 are stitched to the one side portion 34A and the other side portion 34B of the base fabric 34 at seams T10, T11 shown in FIG. 15, respectively.

Figure 15:
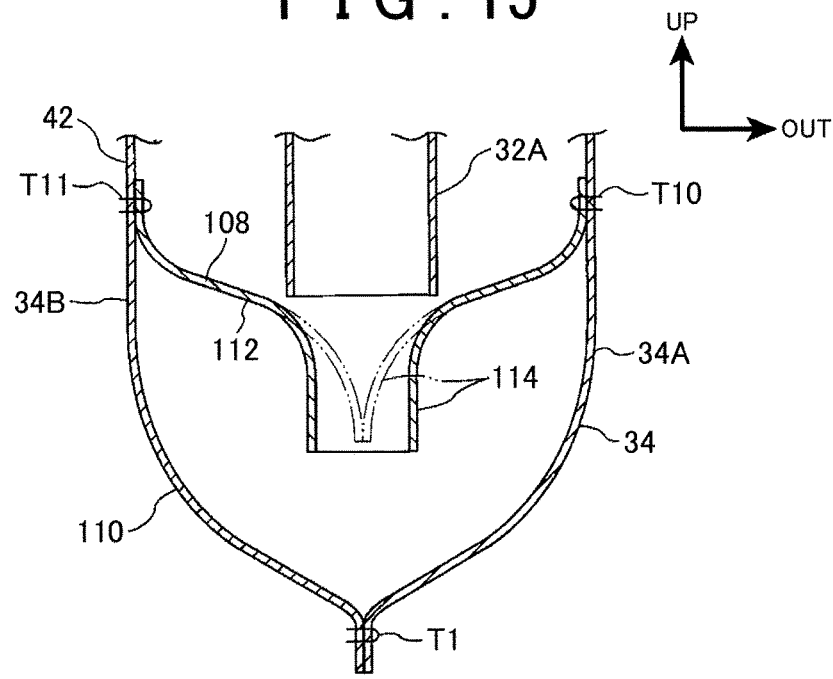
FIG. 15 is an enlarged sectional view showing a section taken along line F15-F15 of FIG. 13.

This up-down partition cloth 108 is stitched to a lower end of the front-rear partition cloth 104 at a not-shown seam. A check valve 114 in a cylindrical shape projecting downward is provided to a rear end of this up-down partition cloth 108. An inside of this check valve 114 is communicated with the inside of the rectifying portion 32A as shown in FIG. 15, and the gas injected from the inflator 24 is guided by the check valve 114 into the lower bag section 110. Through this, if the inner pressure of the lower bag section 110 becomes increased to not less than a predetermined value, the check valve 114 is pressed and crushed by the inner pressure of the lower bag section 110 so as to be blocked up (see a two-dot chain line in FIG. 15). Accordingly, it is configured to restrict the gas flow from the lower bag section 110 to the rear bag section 42.

If the inflation and deployment state of the side airbag 102 is viewed from the vehicle width direction, the up-down partition cloth 108 is defined to downwardly tilt in the frontward direction relative to the front-rear direction (direction along Arrow X of FIG. 13) of the seat back 16. Through this, the inflation thickness in the vehicle up-down direction of the inflating and deploying lower bag section 110 is configured to be smaller as it extends toward the vehicle frontward direction. The lumbar region L of the occupant P is restrained by this lower bag section 110.

In the present embodiment, the configurations other than the above are the same as those of the aforementioned first embodiment. Accordingly, the same operational effect is attained as that of the aforementioned first embodiment. In addition, in the present embodiment, it is possible to retain the inner pressure of the lower bag section 110 to be high by the check valve 114. Accordingly, it is possible to effectively restrain the lumbar region L of the occupant P in position by the lower bag section 110.

In the present embodiment, the inflation thickness in the vehicle up-down direction of the inflating and deploying lower bag section 110 is configured to be smaller as it extends toward the vehicle frontward direction; therefore, even if the side airbag 102 inflates and deploys in a state in which the occupant, the luggage, or the like is located frontward of a lower portion of the side support section 16B, it is possible to reduce influence from the lower bag section 110 to the occupant, the luggage, or the like.

Fifth Embodiment

Figure 16:
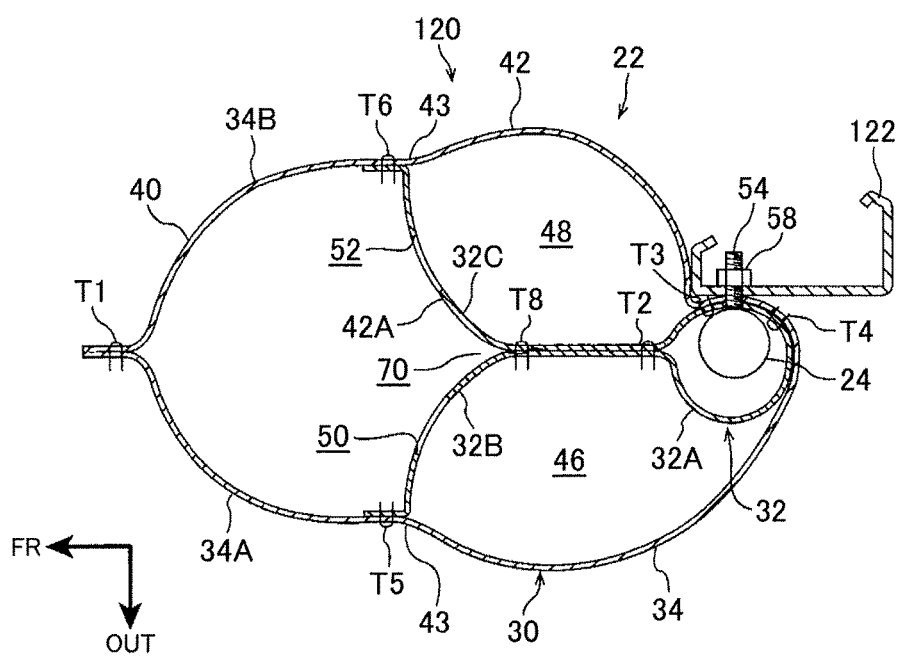
FIG. 16 is a plan sectional view corresponding to FIG. 3, and shows an inflation and deployment state of a side airbag that is a component of a vehicle side airbag device according to a fifth embodiment of the present invention.

In FIG. 16, an inflation and deployment state of the side airbag 22 that is a component of a vehicle side airbag device 120 according to the fifth embodiment of the present invention is shown in a plan sectional view corresponding to FIG. 3. In this embodiment, a not-shown vehicle seat is configured to be a front seat, and the side airbag 22 and the inflator 24 are fixed to a side frame 122 of the front seat. In this front seat, a side support section of a seat back of this front seat is defined to have a greater frontward projection than that of the vehicle seat 12 (rear seat) according to the aforementioned first embodiment. Hence, the left partition 32B and the right partition 32C of the front-rear partition cloth 32 are stitched to each other at a seam T8 defined to be closer to the front end of the bag body 30 than the seam T2. Through this, it is possible to stabilize a position of a boundary between the front bag section 40 and the rear bag section 42 that are partitioned by the front-rear partition cloth 32, and the side airbag 22 can also be used for the front seat.

Sixth Embodiment

Figure 17:
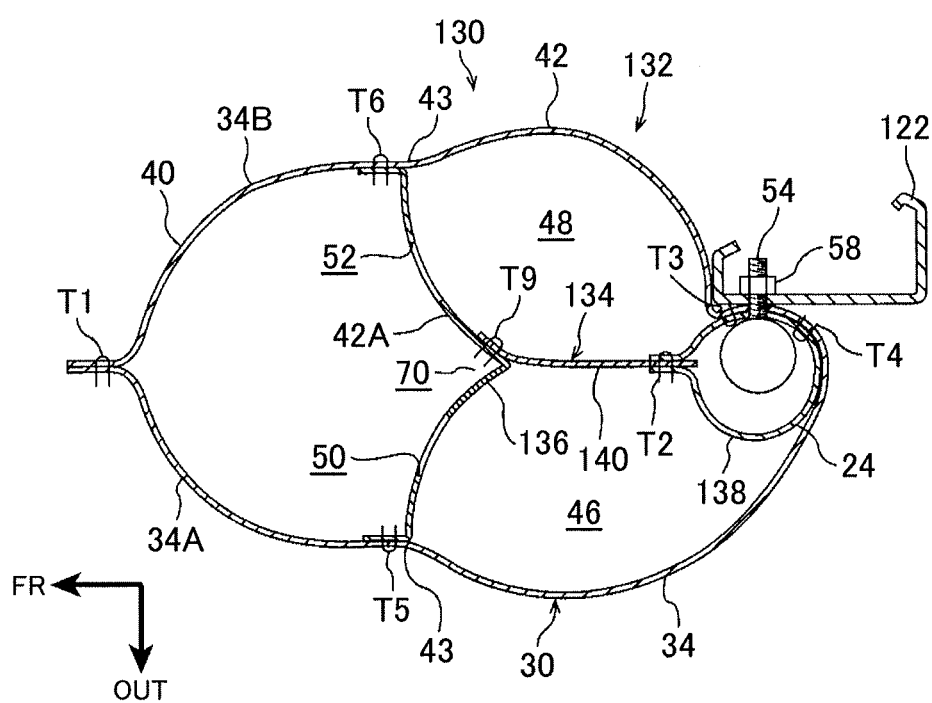
FIG. 17 is a plan sectional view corresponding to FIG. 3, and shows an inflation and deployment state of a side airbag that is a component of a vehicle side airbag device according to a sixth embodiment of the present invention.

In FIG. 17, an inflation and deployment state of a side airbag 132 that is a component of a vehicle side airbag device 130 according to the sixth embodiment of the present invention is shown in a plan sectional view corresponding to FIG. 3. In this embodiment, the configuration of a front-rear partition cloth 134 is different from that of the front-rear partition cloth 32 according to the aforementioned first embodiment. This front-rear partition cloth 134 includes a main body 136 partitioning the bag body 30 into the front bag section 40 and the rear bag section 42, a rectifying portion 138 in a cylindrical shape having the same configuration as that of the rectifying portion 32A of the front-rear partition cloth 32, and a strap portion 140 extending across between the main body 136 and the rectifying portion 138. This strap portion 140 is not used for partitioning the rear bag section 42 into the left and right chambers 46, 48, but is formed in a long web shape, and is stitched to the main body 136 and to the rectifying portion 138 at the seam T2 and a seam T9, respectively.

When this side airbag 132 inflates and deploys, the strap portion 140 is stretched, thereby bringing an intermediate portion in the vehicle width direction of the main body 136, that is, an intermediate portion in the vehicle width direction of the front surface 42A of the rear bag section 42 to be recessed toward the vehicle rearward direction (see the state in FIG. 17). Hence, even if the occupant is in an inappropriate position frontward of the side support section 16B, it is possible to prevent or suppress influence from the rear bag section 42 to this occupant. Furthermore, because the above strap portion 140 is not used for partitioning the rear bag section 42 into the left and right chambers 46, 48, it is possible to simplify the structure of the front-rear partition cloth 32, compared with the configuration of the rear bag section 42 partitioned by the front-rear partition cloth 32 into the left and right chambers 46, 48.

Supplementary Explanation of Embodiments

In each of the aforementioned embodiments, each of the front-rear partition cloths 32, 84, 94, 104, 134 as the front-rear partition is configured to include the rectifying portion 32A or 138, but the present invention is not limited to this, and each front-rear partition may be configured to include no rectifying portion.

In each of the aforementioned embodiments, it is configured that each of the front-rear partition cloths 32, 84, 94, 104, 134 as the front-rear partition, and the up-down partition cloth 108 as the up-down partition may be configured to be made of a cloth material, but the present invention is not limited to this, and each of the front-rear partitions may be configured to be made of a sheet material having flexibility.

Furthermore, the present invention may be variously changed and carried out without departing from the scope of the invention. In addition, it is needless to mention that the scope of rights of the present invention is not limited to each aforementioned embodiment.

The disclosure of Japanese Patent Application No. 2013-159709 is incorporated herein by reference in its entirety. All publications, patent applications, and technical standards described in the present specification are herein incorporated by reference to the same extent as if each individual publication, patent application, or technical standard was specifically and individually indicated to be incorporated by reference.

The invention claimed is:

1. A vehicle side airbag device comprising:
an inflator that generates gas by being actuated;
a bag body formed in a bag form, the bag body housed in a folded-up state inside a side support section of a seat back of a vehicle seat, the bag body inflating and deploying to a vehicle frontward direction of the side support section if the gas is supplied inside the bag body; and
a front-rear partition that partitions the bag body into a front bag section and a rear bag section, the front-rear partition bringing an intermediate portion in a vehicle width direction of a front surface of the rear bag section to be recessed toward a vehicle rearward direction if the inflation and deployment state of the bag body is viewed from a plan sectional view, the front-rear partition including a rectifying portion inside of which the inflator is housed, and which is integral with the intermediate portion,
in the bag body, the intermediate portion of the front surface of the rear bag section is positioned inward of a portion of the front-rear partition joined to the bag body in the vehicle width direction.

2. The vehicle side airbag device according to claim 1, wherein if the inflation and deployment state is viewed from the vehicle width direction, the front-rear partition is provided in such a manner that at least part of a front edge of the rear bag section is located at a more vehicle rearward position than a front edge of the side support section.

3. The vehicle side airbag device according to claim 2, wherein
the seat back is located at a lateral position of a side door of the vehicle, and
the at least part of the front edge of the rear bag section is defined at a height equivalent to a height of an upper surface of an armrest provided to the side door.

4. The vehicle side airbag device according to claim 2, wherein the at least part of a front edge of the rear bag section is a lower portion of the front edge of the rear bag section.

5. The vehicle side airbag device according to claim 1, wherein the front-rear partition is provided in such a manner that a front edge of the inflating and deploying rear bag section extends along an up-down direction of the seat back.

6. The vehicle side airbag device according to claim 1, wherein
the front-rear partition is provided in such a manner that the front edge of the inflating and deploying rear bag section is composed of a vertical extending portion extending along the up-down direction of the seat back and a tilting portion obliquely upwardly extending in the vehicle frontward direction from an upper end of the vertical extending portion.

7. The vehicle side airbag device according to claim 6, further comprising:
an up-down partition that partitions the bag body into the front and rear bag sections and a lower bag section; and
a check valve that guides the gas from the inflator provided inside the rear bag section into the lower bag section, the check valve restricting a gas flow from the lower bag section to the rear bag section by increase in inner pressure of the lower bag section.

8. The vehicle side airbag device according to claim 7, wherein
if the inflation and deployment state is viewed from the vehicle width direction, the up-down partition is so defined as to downwardly tilt in the frontward direction relative to a front-rear direction of the seat back.

9. The vehicle side airbag device according to claim 1, wherein
the front-rear partition includes:
a main body that partitions the bag body into the front bag section and the rear bag section;
a cylindrical-shaped rectifying portion that is stitched to a rear end of the bag body, and rectifies the gas from the inflator; and
a strap portion extending across between the main body and the rectifying portion.

10. A vehicle seat comprising:
a seat cushion;
a seat back; and
the vehicle side airbag device according to claim 1, the vehicle side airbag device housed inside a side support section of the seat back in a state in which the bag body is folded up.

11. The vehicle side airbag device according to claim 1, wherein
the front-rear partition has a first joined portion and a second joined portion, the first joined portion is joined to a first side of the bag body in the vehicle width direction, the second joined portion is joined to a second side of the bag body in the vehicle width direction, and
the intermediate portion of the front surface of the rear bag is positioned between the first joined portion and the second joined portion in the vehicle width direction, and is recessed further in the vehicle rearward direction than the first joined portion and the second joined portion.

12. A vehicle side airbag device comprising:
an inflator that generates gas by being actuated;
a bag body formed in a bag form, the bag body housed in a folded-up state inside a side support section of a seat back of a vehicle seat, the bag body inflating and deploying to a vehicle frontward direction of the side support section if the gas is supplied inside the bag body; and
a front-rear partition that partitions the bag body into a front bag section and a rear bag section, the front-rear partition bringing an intermediate portion in a vehicle width direction of a front surface of the rear bag section to be recessed toward a vehicle rearward direction if the inflation and deployment state of the bag body is viewed from a plan sectional view, wherein in the bag body, the intermediate portion of the front surface of the rear bag section is positioned inward of a portion of the front-rear partition joined to the bag body in the vehicle width direction, and the front-rear partition partitions the rear bag section into left and right chambers that are arranged side by side in the vehicle width direction in the inflation and deployment state.

13. The vehicle side airbag device according to claim 12, wherein the front-rear partition includes a left partition and a right partition that are arranged side by side in the vehicle width direction in the inflation and deployment state.

14. The vehicle side airbag device according to claim 13, wherein the front-rear partition is a front-rear partition cloth formed of a cloth material, and the front-rear partition cloth integrally includes the left partition and the right partition, and the cylindrical-shaped rectifying portion that distributes the gas from the inflator to the left and right chambers.

15. The vehicle side airbag device according to claim 14, wherein in the front-rear partition cloth, the left partition and the right partition are stitched to the rectifying portion at a seam, and the left partition and the right partition are stitched to each other at another seam defined to be closer to a front end of the bag body than the seam.

16. The vehicle side airbag device according to claim 12, wherein the inflator and a rectifying portion that distributes the gas from the inflator into the left and right chambers are provided inside the rear bag section, and left and right communicating ports that respectively communicate the left and right chambers with an inside of the front bag section are formed in the front-rear partition.

17. The vehicle side airbag device according to claim 16, wherein the rectifying portion is composed of part of the front-rear partition.

18. The vehicle side airbag device according to claim 17, wherein the rectifying portion is formed in a cylindrical shape having flexibility, and the inflator is housed inside the rectifying portion.

19. The vehicle side airbag device according to claim 18, wherein an aperture is formed in an intermediate portion in an axial direction of the rectifying portion.

20. The vehicle side airbag device according to claim 12, wherein the left and right chambers are formed to be left-right asymmetric.

21. The vehicle side airbag device according to claim 12, wherein in an upper portion of the rear bag section, a front extending portion that extends above the front bag section in the inflation and deployment state is formed, and the upper portion of the rear bag section including the front extending portion is not partitioned into the left and right chambers.

22. The vehicle side airbag device according to claim 12, wherein in an upper portion of the rear bag section, a front extending portion that extends above the front bag section in the inflation and deployment state is formed, and the upper portion of the rear bag section including the front extending portion is partitioned into the left and right chambers.

* * * * *